United States Patent
Matsumura et al.

(10) Patent No.: US 12,170,627 B2
(45) Date of Patent: Dec. 17, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 523 days.

(21) Appl. No.: 17/598,103

(22) PCT Filed: Mar. 27, 2019

(86) PCT No.: PCT/JP2019/013398
§ 371 (c)(1),
(2) Date: Sep. 24, 2021

(87) PCT Pub. No.: WO2020/194611
PCT Pub. Date: Oct. 1, 2020

(65) Prior Publication Data
US 2022/0190980 A1 Jun. 16, 2022

(51) Int. Cl.
*H04L 5/00* (2006.01)
*H04W 72/12* (2023.01)
(Continued)

(52) U.S. Cl.
CPC ....... *H04L 5/0032* (2013.01); *H04W 72/1273* (2013.01); *H04W 72/23* (2023.01)

(58) Field of Classification Search
CPC ... H04W 72/23; H04W 72/21; H04W 72/231; H04W 72/232; H04W 72/27;
(Continued)

(56) References Cited

U.S. PATENT DOCUMENTS

2018/0006791 A1  1/2018  Marinier et al.
2018/0019843 A1*  1/2018  Papasakellariou .... H04L 1/1854
(Continued)

FOREIGN PATENT DOCUMENTS

CN  113661669 B  *  2/2019
CN  112292823 A  *  1/2021  ........... H04L 1/0073
(Continued)

OTHER PUBLICATIONS

Office Action issued in Japanese Patent Application No. 2021-508557, dated Jan. 10, 2023 (6 pages).
(Continued)

*Primary Examiner* — Phong La
(74) *Attorney, Agent, or Firm* — Osha Bergman Watanabe & Burton LLP

(57) ABSTRACT

One aspect of a user terminal according to the present invention includes: a receiving section that receives a downlink shared channel transmitted from a plurality of transmission/reception points; and a control section that controls transmission of a transmission confirmation signal corresponding to the downlink shared channel, based on downlink control information including at least one of a count value and a total value of DL assignment jointly controlled in the plurality of transmission/reception points.

3 Claims, 22 Drawing Sheets

(51) Int. Cl.
*H04W 72/1273* (2023.01)
*H04W 72/14* (2009.01)
*H04W 72/23* (2023.01)

(58) Field of Classification Search
CPC ............. H04W 72/29; H04W 72/1273; H04W 72/1263; H04L 5/0032; H04L 5/003; H04L 5/0048; H04L 5/0053; H04L 5/0058; H04L 5/0078
See application file for complete search history.

(56) References Cited

U.S. PATENT DOCUMENTS

| | | | |
|---|---|---|---|
| 2019/0045489 A1* | 2/2019 | He | H04W 72/23 |
| 2019/0149271 A1* | 5/2019 | Yin | H04L 1/1607 370/329 |
| 2019/0342907 A1* | 11/2019 | Huang | H04W 72/23 |
| 2022/0053532 A1* | 2/2022 | Baldemair | H04W 72/1273 |
| 2022/0190980 A1* | 6/2022 | Matsumura | H04L 5/0032 |

FOREIGN PATENT DOCUMENTS

| | | | | |
|---|---|---|---|---|
| JP | 2018-512096 A | | 5/2018 | |
| WO | WO-2019047590 A1 | * | 3/2019 | ........... H04L 1/1607 |

OTHER PUBLICATIONS

International Search Report issued in PCT/JP2019/013398 on Jul. 2, 2019 (1 page).
Written Opinion of the International Searching Authority issued in PCT/JP2019/013398 on Jul. 2, 2019 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
MediaTek Inc.; "Enhancements to HARQ for NR-U operation"; 3GPP TSG RAN WG1 #96, R1-1901800; Athens, Greece; Feb. 25-Mar. 1, 2019 (13 pages).

* cited by examiner

OPTION 2-1

OPTION 2-2

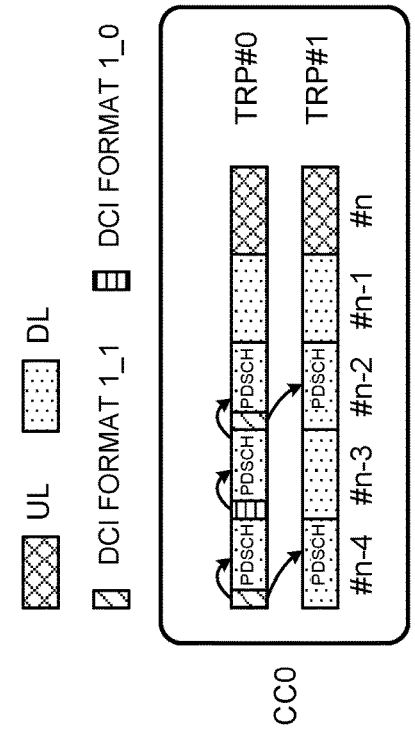
FIG. 6A
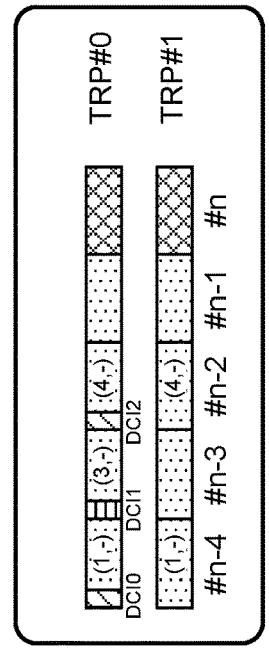
FIG. 6C
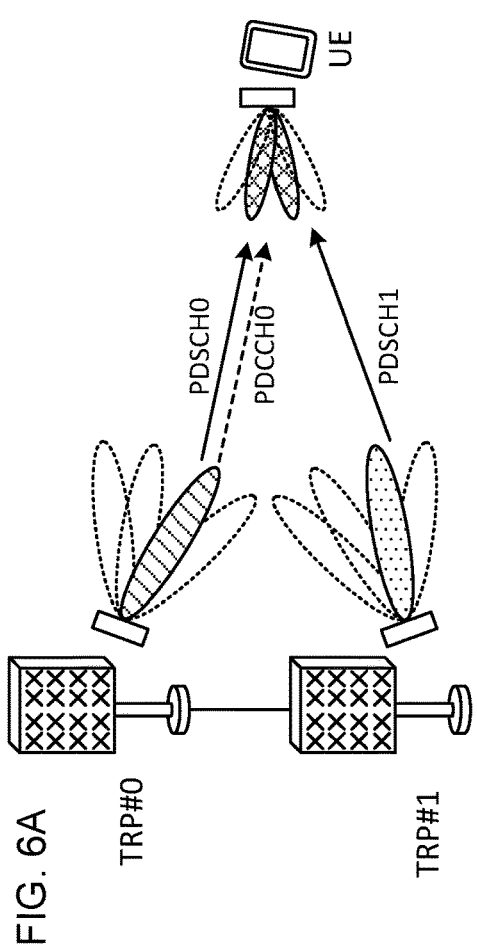
FIG. 6B
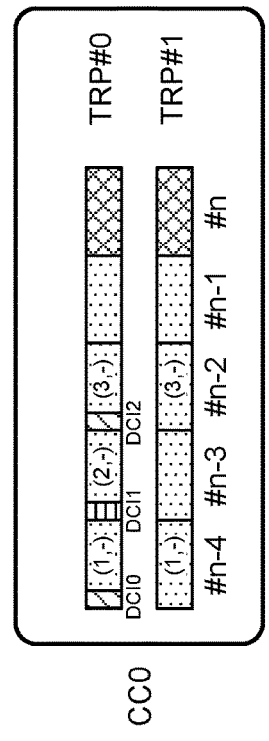

SEPARATE COUNTER DAI AND SEPARATE TOTAL DAI

SEPARATE COUNTER DAI AND SEPARATE TOTAL DAI

USER TERMINAL AND RADIO COMMUNICATION METHOD

TECHNICAL FIELD

The present invention relates to a user terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, 3GPP Rel. 8 to Rel. 14), a user terminal (User Equipment (UE)) controls transmission of a physical uplink shared channel (for example, a Physical Uplink Shared Channel (PUSCH)) and reception of a downlink shared channel (for example, a Physical Downlink Control Channel (PDSCH)), based on downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a scheme in which one or a plurality of transmission/reception points (TRPs) (multi-TRPs) perform DL transmission for a user terminal (User Equipment (UE)) has been under study.

However, in NR specifications up to the present, multi-TRPs are not taken into consideration. Thus, when multi-TRPs are used, how to control transmission of a UL signal (for example, uplink control information or the like) has not yet been fully studied.

In the light of this, the present disclosure has one object to provide a user terminal and a radio communication method capable of appropriately carrying out UL transmission even when multi-TRPs are used.

Solution to Problem

One aspect of a user terminal according to the present invention includes: a receiving section that receives a downlink shared channel transmitted from a plurality of transmission and/or reception points; and a control section that controls transmission of a transmission confirmation signal corresponding to the downlink shared channel, based on downlink control information including at least one of a count value and a total value of DL assignment jointly controlled in the plurality of transmission and/or reception points.

Advantageous Effects of Invention

According to the present invention, UL transmission can be appropriately carried out even when multi-TRPs are used.

BRIEF DESCRIPTION OF DRAWINGS

FIG. 6A to FIG. 6C are each a diagram to show an example of count control of the DAI according to a second aspect;

DESCRIPTION OF EMBODIMENTS (Multi-TRP)

For NR, a scheme in which one or a plurality of transmission/reception points (TRPs) (multi-TRPs) perform DL transmission (for example, PDSCH transmission) for a UE by using one or a plurality of panels (multiple panels) has been under study. Note that, in this specification, the transmission/reception point (TRP) may be interpreted as a transmission point, a reception point, a panel, a cell, a serving cell, a carrier, or a component carrier (CC).

Figure 1A:
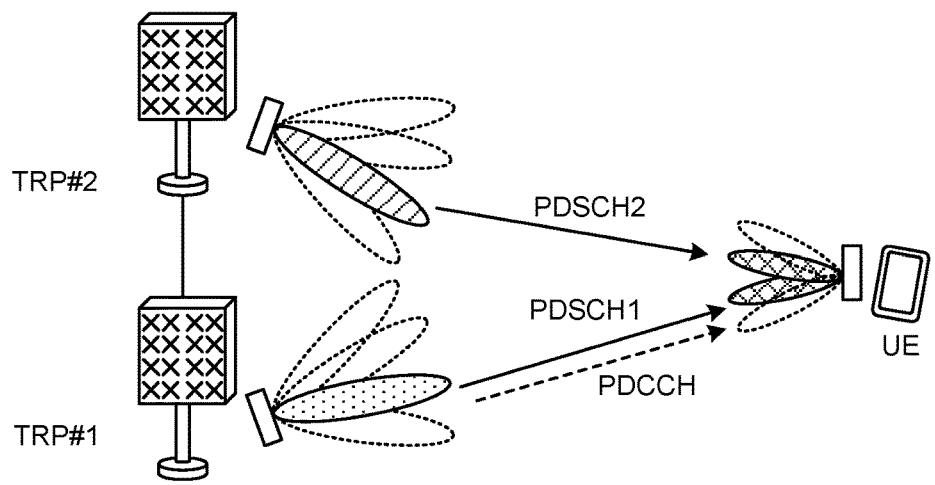
FIG. 1A to FIG. 1C are each a diagram to show an example of a multi-TRP scenario.
Figure 1B:
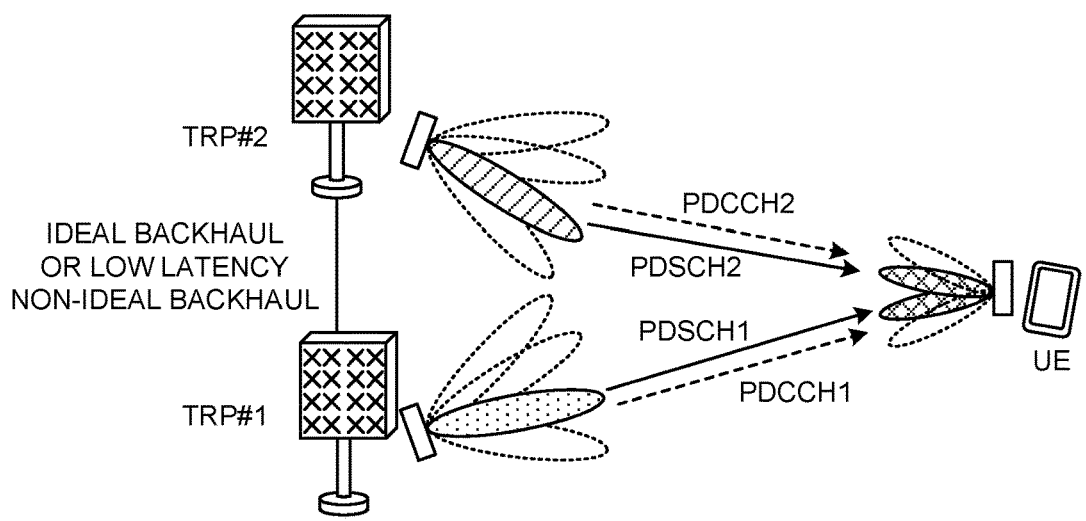
Figure 1C:
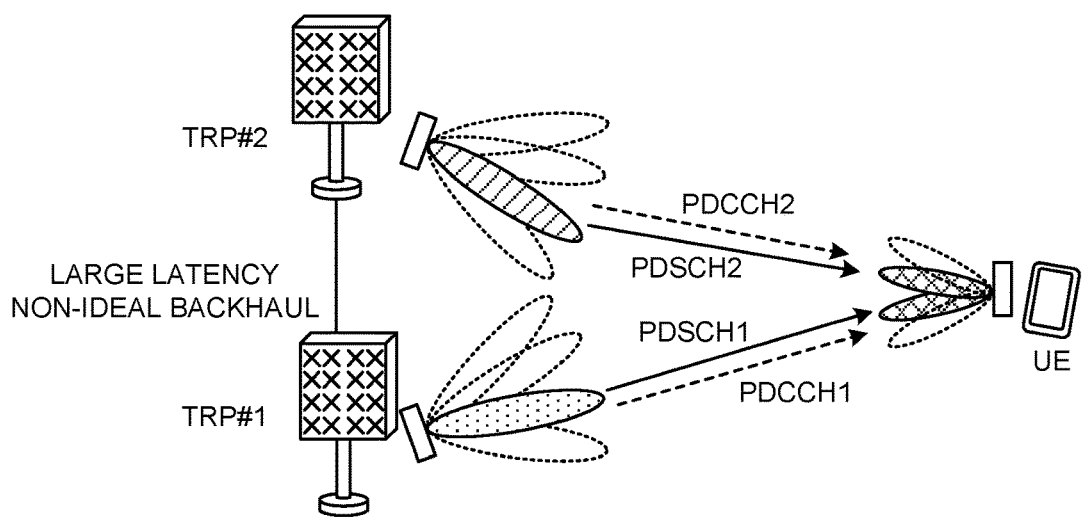

FIGS. 1A to 1C are each a diagram to show an example of a multi-TRP scenario. In FIGS. 1A to 1C, it is assumed that each TRP can transmit four different beams, but this is not restrictive. Note that, in FIGS. 1A to 1C, each TRP includes one panel. However, one TRP may include a plurality of panels, and reception of a PDSCH from each of the plurality of panels may be controlled by a PDCCH from a single panel or a plurality of panels.

FIG. 1A shows an example of a case in which only one TRP (in the present example, TRP 1) out of the multi-TRPs transmits a control signal (for example, a downlink control channel (Physical Downlink Control Channel (PDCCH))) to the UE, and the multi-TRP transmit data signals (for example, downlink shared channels (Physical Downlink Shared Channels (PDSCHs))).

For example, in FIG. 1A, the UE receives PDSCHs 1 and 2 respectively transmitted from TRP #1 and TRP #2, based on one PDCCH (DCI) from TRP #1. In this manner, scheduling of the PDSCH from a plurality of TRPs using the PDCCH (DCI) from a single TRP is also referred to as single DCI, a single PDCCH, a single master mode, PDCCH type A (first PDCCH type), DMRS port group type A (first DMRS port group type) or the like.

FIG. 1B shows an example of a case in which each of the multi-TRPs transmits different control signals (for example, PDSCHs) to the UE, and the multi-TRPs transmit data signals (for example, PDSCHs).

For example, in FIGS. 1B and 1C, the UE receives PDSCHs 1 and 2 respectively transmitted from TRP #1 and TRP #2, based on PDSCHs (DCI) 1 and 2 respectively transmitted from TRP #1 and TRP #2. In this manner, scheduling of the PDSCHs from a plurality of TRPs using the PDCCHs (DCI) from a plurality of TRPs is also referred to as multiple pieces of DCI, multiple PDCCHs, multiple master modes, or the like.

In the multiple PDCCHs, as shown in FIG. 1B, the plurality of TRPs (for example, TRP #1 and TRP #2) may be connected with an ideal backhaul, or may be connected with a low latency non-ideal backhaul. The scenario shown in FIG. 1B is also referred to as PDCCH type B (second PDCCH type), DMRS port group type B (second DMRS port group type), or the like.

Alternatively, in the multiple PDCCHs, as shown in FIG. 1C, the plurality of TRPs (for example, TRP #1 and TRP #2) may be connected with a large latency non-ideal backhaul.

The scenario shown in FIG. 1C is also referred to as PDCCH type C (third PDCCH type), DMRS port group type C (second DMRS port group type), or the like.

In the multi-TRP scenario as described above, transmission of a non-coherent (non-coherent transmission) DL signal (for example, a PDSCH) from each of the plurality of TRPs has been under study. Transmission of non-coherent DL signals (or, DL channels) in cooperation with each other from the plurality of TRPs is also referred to as NCJT (Non-Coherent Joint Transmission).

For example, the PDSCHs corresponding to the same codeword (CW) may be transmitted from the plurality of TRPs by using different layers. For example, PDSCH 1 corresponding to CW 1 may be transmitted from TRP #1 by using a certain number of layers (for example, layers 1 and 2), and PDSCH 2 corresponding to CW 1 may be transmitted from TRP #2 by using a certain number of layers (for example, layers 3 and 4).

Alternatively, the PDSCHs corresponding to different CWs may be transmitted from the plurality of TRPs. For example, PDSCH 1 corresponding to CW 1 may be transmitted from TRP #1, and PDSCH 2 corresponding to CW 2 may be transmitted from TRP #2. Note that the CW may be interpreted as a transport block (TB).

The plurality of PDSCHs on which NCJT is performed may be assumed not to be quasi-co-location (QCL) (not quasi-co-located). The plurality of PDSCHs on which NCJT is performed may be determined to be partially or entirely overlapped in at least one of the time and frequency domains.

In the multi-TRP scenario described above, how to control transmission of uplink control information (for example, also referred to as UCI) is a problem. The UCI includes channel state information (CSI) or the like that is calculated based on the HARQ-ACK corresponding to the PDSCH and a DL reference signal.

For example, when the UE receives the PDSCHs (PDSCH 1 and PDSCH of FIG. 1) transmitted from the plurality of TRPs, how to transmit HARQ-ACK 1 for PDSCH 1 and HARQ-ACK 2 for PDSCH 2 is a problem. The HARQ-ACK may be interpreted as at least one of a HARQ-ACK payload, a HARQ-ACK feedback, an ACK/NACK payload, and an ACK/NACK feedback.

As transmission of a plurality of HARQ-ACKs, separate transmission of the plurality of HARQ-ACKs is conceivable. For example, transmissions of HARQ-ACK 1 for PDSCH 1 and HARQ-ACK 2 for PDSCH 2 are controlled separately from each other. The method of separately controlling the transmissions of HARQ-ACK 1 and HARQ-ACK 2 may be referred to as separate ACK/NACK feedback.

On the other hand, in certain cases, it may be preferable to simultaneously control the transmissions of HARQ-ACK 1 for PDSCH 1 and HARQ-ACK 2 for PDSCH 2. The method of simultaneously controlling the transmissions of HARQ-ACK 1 and HARQ-ACK 2 may be referred to as joint ACK/NACK feedback.

In the multi-TRP scenario, in a case that the PDSCH of each TRP is scheduled by one PDCCH (or, DCI) or a case that the plurality of TRPs are connected with each other with the ideal backhaul or the low latency non-ideal backhaul, it is preferable to apply the joint ACK/NACK feedback. In these cases, by simultaneously performing transmissions of the HARQ-ACKs for each TRP, transmission control (for example, resource specification or the like) of the HARQ-ACKs can be simplified, and throughput can be enhanced.

As a matter of course, the case in which the joint ACK/NACK feedback can be applied is not limited to this.

However, in the multi-TRP scenario, how to control the joint ACK/NACK feedback (or, the joint ACK/NACK payload) has not yet been fully studied.

For example, when the HARQ-ACK is fed back, it is conceivable to transmit the HARQ-ACK corresponding to each PDSCH by including the HARQ-ACK in the HARQ-ACK codebook. The HARQ-ACK codebook includes the HARQ-ACK codebook in which the number of HARQ-ACK bits is semi-statically configured, and the HARQ-ACK codebook in which the number of HARQ-ACK bits is dynamically configured. The HARQ-ACK codebook in which the number of HARQ-ACK bits is semi-statically configured may be referred to as a type 1 HARQ-ACK codebook. The HARQ-ACK codebook in which the number of HARQ-ACK bits is dynamically configured may be referred to as a type 2 HARQ-ACK codebook.

When the type 2 HARQ-ACK codebook is applied, the UE may feed back the HARQ-ACK bits for each PDSCH selected based on a certain condition. The certain condition may be a monitoring occasion of the PDCCH corresponding to the DCI for scheduling the PDSCH. The monitoring occasion may correspond to the DCI for indicating HARQ-ACK transmission on the same UL channel (for example, the PUCCH or the PUSCH) in a certain transmission period (for example, slot n).

The UE may determine the number of bits of the type 2 HARQ-ACK codebook, based on a certain field in the DCI. The certain field may be referred to as a DL assignment index (Downlink Assignment Indicator (Index) (DAI)) field. The DAI field may be split into a counter DAI (cDAI) and a total DAI (tDAI).

The counter DAI may indicate a counter value of downlink transmission (PDSCH, data, TB) scheduled in a certain period. For example, the counter DAI in the DCI for scheduling data in the certain period may indicate a number that is counted in the certain period first in the frequency domain (for example, CC index order) and then in the time domain (time index order).

The total DAI may indicate a total value (total number) of data scheduled in a certain period. For example, the total DAI in the DCI for scheduling data in a certain time unit (for example, a PDCCH monitoring occasion) in the certain period may indicate a total number of data scheduled before the certain time unit (also referred to as a point, timing, or the like) in the certain period.

In the multi-TRP scenario, when the HARQ-ACKs for the PDSCHs transmitted from the plurality of TRPs are performed in a certain transmission period (for example, slot n), how to control the HARQ-ACK transmission is a problem.

The inventors of the present invention came up with the idea of applying the same type of HARQ-ACK codebook to the HARQ-ACKs (for example, HARQ-ACK 1 and HARQ-ACK 2) corresponding to different TRPs in the joint ACK/NACK feedback. For example, the joint ACK/NACK feedback is performed by applying any one of the semi-statically configured type 1 HARQ-ACK codebook and the dynamically configured type 2 HARQ-ACK codebook for the HARQ-ACKs corresponding to different TRPs.

The inventors of the present invention came up with the idea of reporting control of the counter DAI and the total DAI or count control of the counter DAI and the total DAI when the dynamically configured HARQ-ACK codebook is applied. The inventors of the present invention came up with the idea of a generation method of the HARQ-ACK codebook when the dynamically configured HARQ-ACK codebook is applied in the multi-TRP scenario.

An embodiment according to the present disclosure will be described below in detail with reference to the drawings. Note that each aspect of the present embodiment may be applied individually, or may be applied in combination. Note that the following description assumes a case in which the dynamically configured type 2 HARQ-ACK codebook (also referred to as a dynamic codebook) is applied to the HARQ-ACKs corresponding to different TRPs. However, this is not restrictive.

Note that, in the present embodiment, a TRP, a panel, an Uplink (UL) transmission entity, an antenna port of a demodulation reference signal (DMRS) (DMRS port), a group of DMRS ports (DMRS port), a group of DMRS ports multiplexed by code division multiplexing (CDM) (CDM group), a control resource set (CORESET), a search space set, a PDSCH, a codeword, a base station, and the like may be interpreted as each other.

A panel Identifier (ID) and a panel may be interpreted as each other. A TRP ID and a TRP may be interpreted as each other. A cell ID and a cell (serving cell) may be interpreted as each other. An ID, an index, and a number may be interpreted as each other.

Note that, in the present embodiment, the cell ID may be interchangeably interpreted as a serving cell ID, a serving cell index, a carrier index, a CC index, a carrier identifier, or the like.

The present embodiment can be applied to a communication system as long as the communication system uses a plurality of TRPs. For example, the present embodiment may be applied to a configuration (NCJT) in which non-coherent DL signals (for example, CWs or TBs) are transmitted in cooperation from a plurality of TRPs, and a configuration in which one DL signal (for example, a CW or a TB) is repeatedly transmitted from a plurality of TRPs. In the repeated transmission, one CW or TB may be repeatedly transmitted in at least one of the time domain, the frequency domain, and the spatial domain.

The following description assumes a case in which the plurality of TRPs have the same cell ID. However, this is not restrictive, and the present embodiment can also be applied to a case in which the plurality of TRPs have different cell IDs.

(First Aspect)

In a first aspect, reporting control of the counter DAI and the total DAI in the multi-TRP scenario will be described.

The network (for example, the base station) includes the counter DAI in the DCI or the counter DAI and the total DAI in the DCI to report to the UE. The base station may determine whether to include only the counter DAI in the DCI or to include the counter DAI and the total DAI in the DCI, based on the number of cells (or, CCs) configured for a DCI format type and a DL.

When the first DCI format is applied, only the counter DAI may be included in the DAI field of the DCI without including the total DAI. The DAI field is configured with certain bits (for example, 2 bits). The first DCI format may be, for example, DCI format 1_0.

When the second DCI format is applied, whether to include only the counter DAI in the DAI field of the DCI or to include the counter DAI and the total DAI in the DCI may be determined, based on the number of cells configured for the DL (or, whether or not carrier aggregation (CA) is applied). For example, when the number of cells configured for DL transmission is one, only the counter DAI may be included in the DAI field of the DCI without including the total DAI. The DAI field is configured with certain bits (for example, 2 bits).

In contrast, when the number of cells for DL transmission is configured to be more than one (when CA is applied), the counter DAI and the total DAI may be included in the DAI field of the DCI. The DAI field is configured with certain bits (for example, 4 bits). In this case, a part of the bits (for example, MSB bit) of the DAI field may correspond to the counter DAI, and the rest of the bits (for example, LSB bit) may correspond to the total DAI. The second DCI format may be, for example, DCI format 1_1.

The base station may configure the count DAI and the total DAI for the PDSCHs (or, the HARQ-ACKs corresponding to the PDSCHs) respectively transmitted from the plurality of TRPs for one DAI field (common DAI field) of certain DCI. Alternatively, the base station may configure the count DAI and the total DAI for the PDSCHs respectively transmitted from the plurality of TRPs for different fields of certain DCI or DAI fields of different DCIs.

The following will describe reporting control of the DAI of a case in which the DCI is transmitted from a certain TRP out of the plurality of TRPs (single PDCCH base) and a case in which the DCI is transmitted from each of the plurality of TRPs (multi-PDCCH base). In the following, description is given by taking an example of a case in which there are two TRPs (M=2). However, the present invention can be similarly applied to a case in which there are three or more TRPs as well.

<Single PDCCH Base>

Figure 2A:
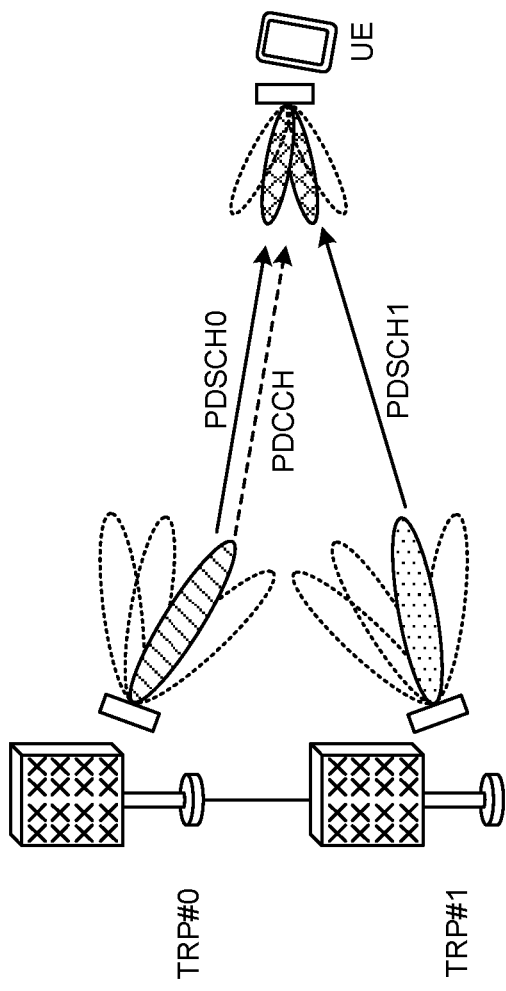
FIG. 2A and FIG. 2B are each a diagram to show an example of reporting control of a DAI according to a first aspect.

FIG. 2A shows an example of a case in which single PDCCH base is applied in multi-TRP transmission. FIG. 2A shows a case in which PDSCH 0 is transmitted from TRP #0, and PDSCH 1 is transmitted from TRP #1. FIG. 2A shows a case in which the PDCCH (or, the DCI) used for scheduling of PDSCH 0 and the PDCCH (or, the DCI) used for scheduling of PDSCH 1 are transmitted from a certain TRP (for example, TRP #0).

When PDSCH 0 is transmitted from TRP #0 and PDSCH 1 is transmitted from TRP #1 in the same time interval (for example, a slot), PDSCH 0 and PDSCH 1 may be scheduled based on one PDCCH (or, DCI) transmitted from TRP #0. Note that, here, the case in which transmission is performed from TRP #0 and TRP #1 is shown. However, respective PDSCHs may be transmitted from different panels of the same TRP.

The base station may adopt a configuration (option 1) in which the plurality of TRPs share the same DAI reporting (DAI indication) or DAI field, or a configuration (option 2) in which each of the TRPs includes its corresponding DAI reporting or DAI field.

[Option 1]

Figure 2B:

The base station configures the DAI field (for example, one DAI field) for TRP #0 and TRP #1 for the DCI (or, the PDCCH) transmitted from TRP #0, and transmits the DAI field to the UE (see FIG. 2B).

For example, a case in which the first DCI format (hereinafter also referred to as DCI format 1_0) is applied, or a case in which the second DCI format (hereinafter also referred to as DCI format 1_1) is applied to the DL in which one cell is configured are assumed. In these cases, the base station uses the DAI field configured with a certain number of bits (here, 2 bits) for reporting of the counter DAI of at least one of TRP #0 and TRP #1.

For example, when one of the PDSCHs (for example, PDSCH 0) is scheduled using certain DCI, the UE may determine that the counter DAI of the DCI corresponds to PDSCH 0. In contrast, when a plurality of PDSCHs (for example, PDSCH 0 and PDSCH 1) are scheduled using certain DCI, the UE may determine that the counter DAI of the DCI corresponds to PDSCH 0 and PDSCH 1.

When DCI format 1_1 is applied to the DL in which a plurality of cells are configured (or, CA is configured), the base station uses the DAI field configured with a certain number of bits (here, 4 bits) for reporting of the counter DAI and the total DAI of at least one of TRP #0 and TRP #1. FIG. 2B shows a case in which the total DAI of at least one of TRP #0 and TRP #1 is reported by using the 1st and 2nd bits of the DAI field and the counter DAI of at least one of TRP #0 and TRP #1 is reported by using the 3rd and 4th bits of the DAI field.

For example, when one of the PDSCHs (for example, PDSCH 0) is scheduled using certain DCI, the UE may determine that the counter DAI and the total DAI of the DCI corresponds to PDSCH 0. In contrast, when a plurality of PDSCHs (for example, PDSCH 0 and PDSCH 1) are scheduled using certain DCI, the UE may determine that the counter DAI and the total DAI of the DCI corresponds to PDSCH 0 and PDSCH 1.

In this case, even where there are a plurality of TRPs, the number of bits of the DAI field of the DCI need not be increased, and thus overhead of the DCI can be prevented from increasing.

[Option 2]

Figure 3A:
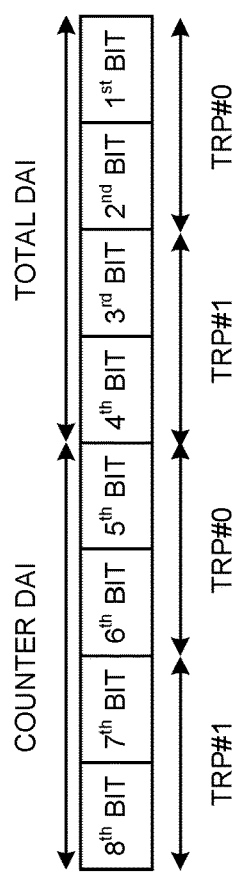
FIG. 3A and FIG. 3B are each a diagram to show another example of reporting control of the DAI according to the first aspect.
Figure 3B:
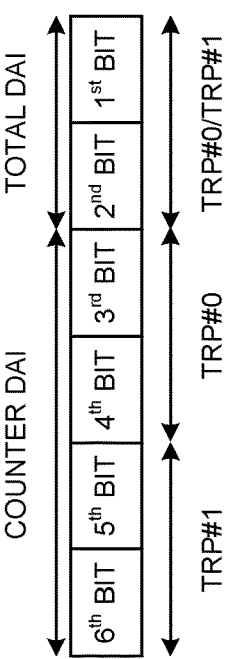
Figure 3B:
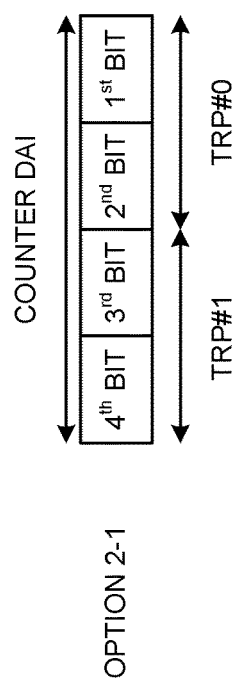

The base station separately configures the first DAI field (at least one of the counter DAI field and the total DAI field) for TRP #0 and the second DAI field for TRP #1, for the DCI transmitted from TRP #0, and transmits the first DAI field and second DAI field to the UE (see FIG. 3).

For example, a case in which DCI format 1_0 is applied, or a case in which DCI format 1_1 is applied to the DL in which one cell is configured are assumed. In these cases, the base station may perform reporting of the counter DAI of TRP #0 (or, PDSCH 0) and TRP #1 (or, PDSCH 1) by using the first counter DAI field and the second counter DAI field each configured with a certain number of bits (here, 2 bits) (see FIG. 3A). The number of bits of the DAI field (for example, the counter DAI field) may be configured to 2×M (M: number of transmission/reception points).

FIG. 3A shows a case in which the counter DAI of TRP #0 is reported by using the 1st and 2nd bits of the DAI field (corresponding to the first counter DAI field), and the counter DAI of the TRP #1 is reported by using the 3rd and 4th bits of the DAI field (corresponding to the second counter DAI field).

For example, when PDSCH 0 and PDSCH 1 are scheduled using certain DCI, the UE may determine that the first counter DAI field of the DCI corresponds to the counter DAI of PDSCH 0, and the second counter DAI field corresponds to the counter DAI of PDSCH 1. In contrast, when one of the PDSCHs (for example, PDSCH 0) is scheduled using certain DCI, it is only necessary that the UE control HARQ-ACK transmission, based on the first counter DAI field corresponding to PDSCH 0.

Whether or not there is configuration of the first counter DAI field and the second counter DAI field (or, the number of bits with which the DAI field is configured) may be controlled according to whether or not there is scheduling of the PDSCH of each of the TRPs. For example, when only the PDSCH (for example, PDSCH 0) of one of the TRPs is scheduled, the number of bits of the DAI field (for example, the second counter DAI field part) corresponding to the unscheduled PDSCH may be set to 0. In this manner, the number of bits of the DCI can be reduced according to whether or not there is scheduling of the PDSCH.

When DCI format 1_1 is applied to the DL in which a plurality of cells are configured, the base station may perform reporting of the counter DAI of TRP #0 (or, PDSCH 0) and TRP #1 (or, PDSCH 1) by using the first counter DAI field and the second counter DAI field, respectively, which each is configured with a certain number of bits (here, 2 bits) (see FIG. 3A).

The base station may perform reporting of the total DAI of TRP #0 (or, PDSCH 0) and TRP #1 (or, PDSCH 1) by using the first total DAI field and the second total DAI field which is configured with a certain number of bits (here, 2 bits) (see FIG. 3A). The number of bits of the DAI field (for example, total DAI+counter DAI field) may be configured to 4×M (M: number of transmission/reception points). A part of the bits (for example, MSB bit) of the DAI field may be configured to 2×M bits to be used for the counter DAI field, and other bits (for example, LSB bit) of the DAI field may be configured to 2×M bits to be used for the total DAI field.

FIG. 3A shows a case in which the total DAI of TRP #0 is reported by using the 1st and 2nd bits of the DAI field (corresponding to the first total DAI field), and the total DAI of TRP #1 is reported by using the 3rd and 4th bits of the DAI field (corresponding to the second total DAI field). FIG. 3A shows a case in which the counter DAI of TRP #0 is reported by using the 5th and 6th bits of the DAI field (corresponding to the first counter DAI field), and the counter DAI of TRP #1 is reported by using the 7th and 8th bits of the DAI field (corresponding to the second counter DAI field).

Whether or not there is configuration of the first total DAI field, the second DAI field, the first counter DAI field, and the second counter DAI field (or, the number of bits included in the DAI field) may be controlled according to whether or not there is scheduling of the PDSCH of each of the TRPs. For example, when only the PDSCH (for example, PDSCH 0) of one of the TRPs is scheduled, the number of bits of the DAI field (for example, the second total DAI field and the second counter DAI field part) corresponding to the unscheduled PDSCH may be set to 0. In this manner, the number of bits of the DCI can be reduced according to whether or not there is scheduling of the PDSCH.

Alternatively, the total DAI field for TRP #0 (or, PDSCH 0) and the total DAI field for TRP #1 (or, PDSCH 1) may be provided in one total DAI field (in a shared manner) (see FIG. 3B). In this case, the number of bits of the DAI field (for example, total DAI+counter DAI field) may be configured to 2×M+2 (M: number of transmission/reception points). A part of the bits (for example, MSB bit) of the DAI field may be configured to 2×M bits to be used for the counter DAI field, and other bits (for example, LSB bit) of the DAI field may be configured to 2 bits to be used for the total DAI field.

FIG. 3B shows a case in which the total DAI of at least one of TRP #0 and TRP #1 is reported by using the 1st and 2nd bits of the DAI field (corresponding to the total DAI field). FIG. 3B shows a case in which the counter DAI of TRP #0 is reported by using the 3rd and 4th bits of the DAI field (corresponding to the first counter DAI field), and the counter DAI of TRP #1 is reported by using the 5th and 6th bits of the DAI field (corresponding to the second counter DAI field).

By sharing the total DAI field with the plurality of TRPs (or, the PDSCHs), the number of bits of the DCI can be prevented from increasing.

<Multi-PDCCH Base>

Figure 4A:
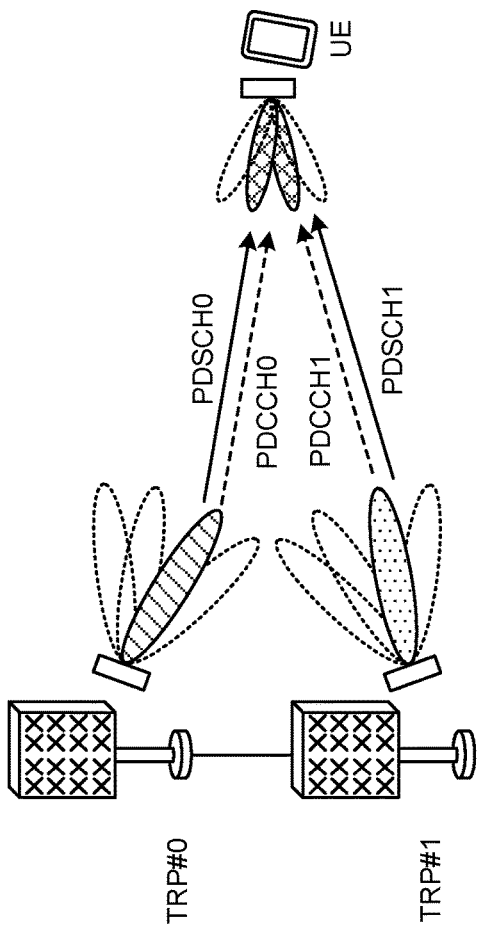
FIG. 4A and FIG. 4B are each a diagram to show another example of reporting control of the DAI according to the first aspect.

FIG. 4A shows an example of a case in which multi-PDCCH base is applied in multi-TRP transmission. FIG. 4A shows a case in which PDSCH 0 is transmitted from TRP #0, and PDSCH 1 is transmitted from TRP #1. FIG. 4A shows a case in which PDCCH 0 (or, DCI) transmitted from TRP #0 is used for scheduling of PDSCH 0, and PDCCH 1 (or, DCI) transmitted from TRP #1 is used for scheduling of PDSCH 1.

The base station configures the first DAI field (at least one of the counter DAI field and the total DAI field) for TRP #0 and the second DAI field for TRP #1 for different PDCCHs (or, DCIs), and transmits the first DAI field and the second DAI field to the UE.

For example, a case in which DCI format 1_0 is applied, or a case in which DCI format 1_1 is applied to the DL in which one cell is configured are assumed. In these cases, in each PDCCH, the base station configures the DAI field configured with a certain number of bits (here, 2 bits), and uses the DAI field for reporting of the counter DAI (see FIG. 4B). The UE may determine the count value of PDSCH 0, based on the counter DAI field reported on PDCCH 0, and determine the count value of PDSCH 1, based on the counter DAI field reported on PDCCH 1.

Figure 4B:
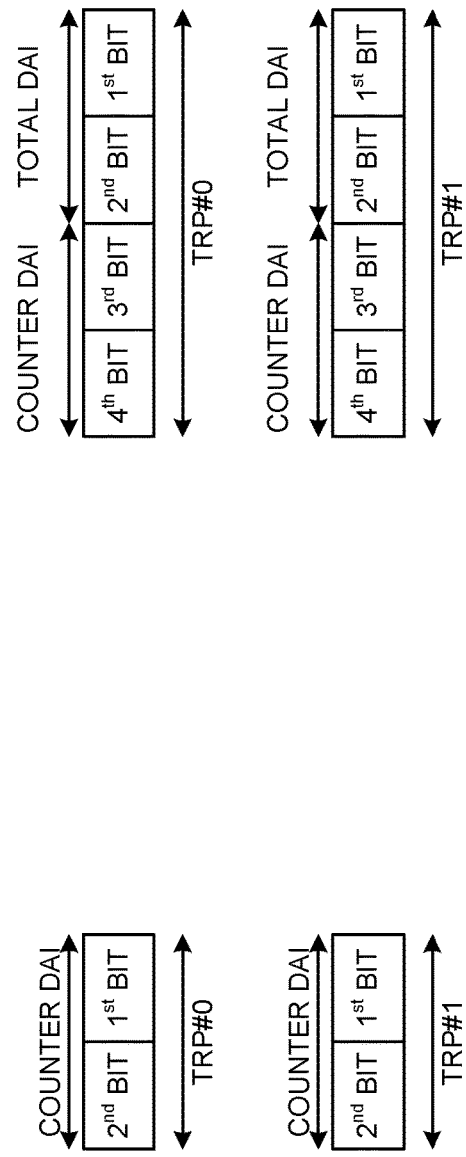

When DCI format 1_1 is applied to the DL in which a plurality of cells are configured, in each PDCCH, the base station configures the DAI field including a certain number of bits (here, 4 bits), and uses the DAI field for reporting of the counter DAI and the total DAI (see FIG. 4B). The UE may determine the total value and the count value of PDSCH 0, based on the total DAI field and the counter DAI field reported on PDCCH 0, and determine the total value and the count value of PDSCH 1, based on the total DAI field and the counter DAI field reported on PDCCH 1.

Figure 5:
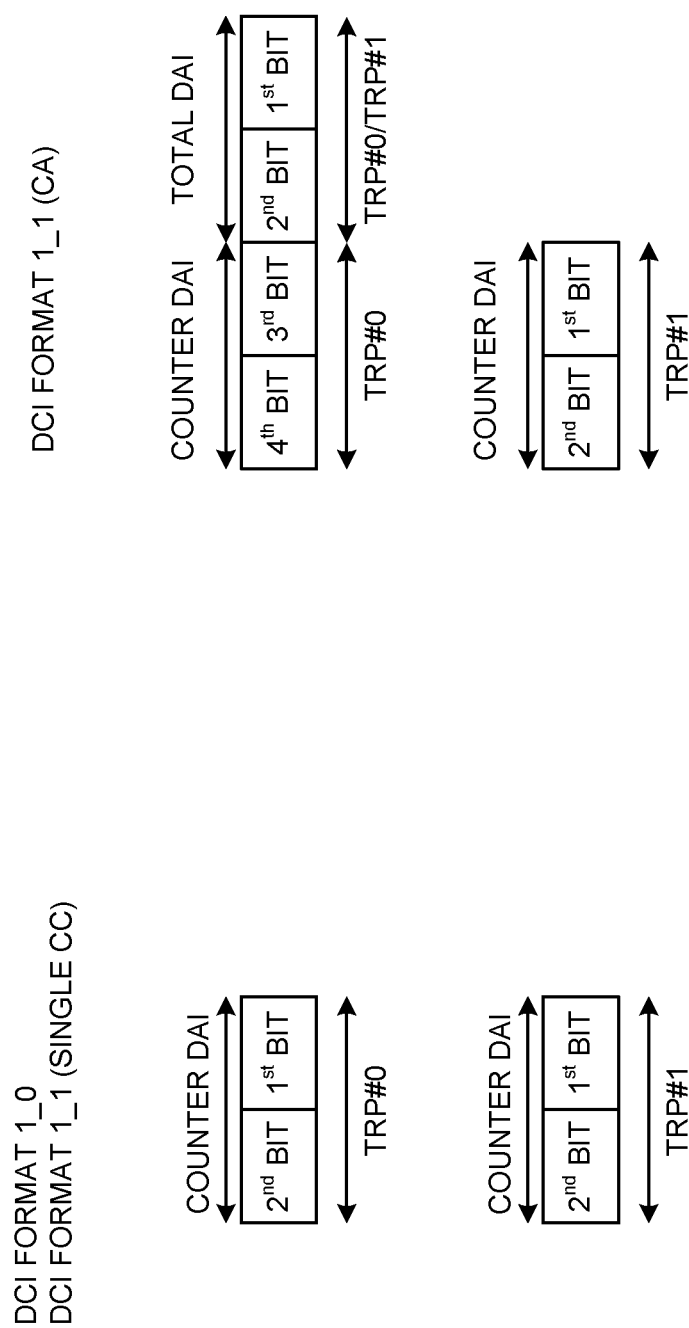
FIG. 5 is a diagram to show another example of reporting control of the DAI according to the first aspect.

Alternatively, the total DAI field for TRP #0 (or, PDSCH 0) and the total DAI field for TRP #1 (or, PDSCH 1) may be provided in the total DAI field of one of the PDCCHs (in a shared manner) (see FIG. 5). FIG. 5 shows a case in which the total DAI field indicating the total value of at least one of TRP #0 and TRP #1 is configured for PDCCH 0 (TRP #0), and the total DAI field is not configured for PDCCH 1 (TRP #1).

By sharing the total DAI field with the plurality of TRPs (or, the PDSCHs), the number of bits of the DCI can be prevented from increasing.

(Second Aspect)

In a second aspect, count control of the counter DAI and the total DAI in the multi-TRP scenario will be described.

The base station may perform control (separately count) so that at least one of the counter DAI and the total DAI is separately counted in the plurality of TRPs. The UE may control HARQ-ACK feedback by determining that at least one of the counter DAI and the total DAI is controlled separately (counted separately) in the plurality of TRPs.

Alternatively, the base station may perform control (jointly count) so that at least one of the counter DAI and the total DAI is jointly counted in the plurality of TRPs. The UE may control HARQ-ACK feedback by determining that at least one of the counter DAI and the total DAI is controlled jointly (counted jointly) in the plurality of TRPs.

Specifically, the base station may control count of the counter DAI and the total DAI between the plurality of TRPs, based on any one of the following (1) to (6).

(1) Separately count the counter DAI between the plurality of TRPs (2) Jointly count the counter DAI between the plurality of TRPs (3) Separately count the counter DAI and the total DAI between the plurality of TRPs (4) Jointly count the counter DAI and the total DAI between the plurality of TRPs (5) Separately count the counter DAI between the plurality of TRPs, and jointly count the total DAI between the plurality of TRPs (6) Jointly count the counter DAI between the plurality of TRPs, and separately count the total DAI between the plurality of TRPs (1) and (2) of the above may be applied to the case in which DCI format 1_0 is applied, or the case in which DCI format 1_1 is applied to the DL in which one cell is configured. (3) to (6) of the above may be applied to the case in which DCI format 1_1 is applied to the DL in which a plurality of cells are configured.

In the following, count control of the DAI of a case in which the DCI is transmitted from a certain TRP out of the plurality of TRPs (single PDCCH base), and a case in which the DCI is transmitted from each of the plurality of TRPs (multi-PDCCH base) will be described. In the following, description is given by taking an example of a case in which there are two TRPs (M=2). However, the present invention can be similarly applied to a case in which there are three or more TRPs as well. The present embodiment can be applied to (1) to (6) of the above, and is not limited to the case shown below.

<Single PDCCH Base>

[Case 1]

In case 1, the following configuration is assumed.

One DAI field is used for the plurality of TRPs

The number of cells (or, CCs) configured for each of the plurality of TRPs is one FIG. 6 shows an example of count control of the DAI of a case in which single PDCCH base is applied in multi-TRP transmission. FIG. 6 shows a case in which one cell (here, CC 0) is configured for TRP #0 and TRP #1, PDSCH 0 is transmitted from TRP #0, and PDSCH 1 is transmitted from TRP #1.

PDSCH 0 and PDSCH 1 may be scheduled using one PDCCH (for example, DCI). The PDCCH may be transmitted from a certain TRP (for example, TRP #0). The format of the DCI transmitted on the PDCCH may be a case in which the first DCI format (hereinafter also referred to as DCI format 1_0) is applied, or the second DCI format (hereinafter also referred to as DCI format 1_1).

DCI format 1_0 may be referred to as fallback DCI. DCI format 1_1 may be referred to as non-fallback DCI. When DCI format 1_0 is applied, or when DCI format 1_1 is applied to the DL in which one cell is configured, only the counter DAI field may be configured, without the total DAI field being configured in the DAI field.

Here, a case in which PDSCH 0 is transmitted in each of slots #n−3, and #n−2 of TRP #0, and PDSCH 1 is transmitted in each of slots #n−4 and #n−2 of TRP #1 is shown (see FIG. 6A). A case in which feedback timing of the HARQ-ACKs for the PDSCHs transmitted in slots #n−4 to #n−1 is configured to slot #n is assumed.

FIG. 6B shows an example of a case in which the counter DAI is separately counted between the plurality of TRPs (for example, (1) of the above). In this case, the counter DAI may be counted first in ascending order of the serving cell index, and then in ascending order of the PDCCH monitoring occasion index m (first in ascending order of serving cell index and then in ascending order of PDCCH monitoring occasion index m).

Here, a case in which the DAI field (one DAI field) for TRP 0 and TRP 1 are configured for the DCI transmitted from TRP #0 in a shared manner (for example, option 1 of the first aspect) is shown. In this case, the base station may configure the count value for the DCI with a certain TRP being used as a reference, in the slot for scheduling the PDSCHs in both of TRP #0 and TRP #1. For example, the DAI value included in the DCI for scheduling PDSCH 0 and PDSCH 1 transmitted in slot #n−2 may be configured to be 3 (with TRP #0 having a large number of PDSCH transmissions being used as a reference).

When the PDSCH is transmitted in at least one of TRP #0 and TRP #1 in a certain slot, the UE may determine that the increment of the DCI value included in the DCI to be transmitted next is 1. For example, even when the PDSCH is transmitted from both of TRP #1 and TRP #2 in slot #n−4, the UE may determine that the increment of the DAI value included in the DCI to be transmitted next (here, the DCI for scheduling the PDSCH of slot #n−3) is 1.

Here, a case in which one DAI field is used for the plurality of TRPs has been shown. However, this is not restrictive. For example, a case in which the DAI fields for TRP #0 and TRP #1 are separately configured for the DCI transmitted from TRP #0 (for example, option 2 of the first aspect) is assumed. In this case, different count values may be configured for the DAI field for TRP #0 (or, PDSCH 0) and the DAI field for TRP #1 (or, PDSCH 1). For example, the DAI value of the DAI field for TRP #0 included in the DCI transmitted in slot #n−2 may be 3, and the DAI value of the DAI field for TRP #1 may be 2.

FIG. 6C shows an example of a case in which the counter DAI is jointly counted between the plurality of TRPs (for example, (2) of the above). In this case, the counter DAI may be counted first in ascending order of the TRP index, then in ascending order of the serving cell index, and then in ascending order of the PDCCH monitoring occasion index m (first in ascending order of TRP/panel index and then in ascending order of serving cell index and then in ascending order of PDCCH monitoring occasion index m).

Alternatively, the counter DAI may be counted first in ascending order of the serving cell index, then in ascending order of the TRP index, and then in ascending order of the PDCCH monitoring occasion index m (first in ascending order of serving cell index and then in ascending order of TRP/panel index and then in ascending order of PDCCH monitoring occasion index m).

Here, a case in which the DAI field (one DAI field) for TRP 0 and TRP 1 are configured for the DCI transmitted from TRP #0 in a shared manner (for example, option 1 of the first aspect) is shown. In this case, the same counter DAI value may be configured for the DCI in the slot scheduled in both of TRP #0 and TRP #1. Here, the DAI value included in the DCI may be determined, with one of the TRPs (for example, TRP #0) being used as a reference.

In this case, when the PDSCHs are transmitted in the plurality of TRPs in the same slot, the UE may determine that the DAI value corresponding to one of the PDSCHs is a different value (for example, DAI value+1). For example, the UE may determine that the DAI value for PDSCH 1 transmitted in slot #n−4 in TRP #1 is 2. When the PDSCHs are transmitted in the plurality of TRPs in the same slot, the UE may determine that the increment of the DAI value included in the DCI to be transmitted next is 2. In contrast, when the PDSCHs are transmitted in one TRP in the same slot, the UE may determine that the increment of the DAI value included in the DCI to be transmitted next is 1.

Here, a case in which one DAI field is used for the plurality of TRPs has been shown. However, this is not restrictive. For example, a case in which the DAI fields for TRP #0 and TRP #1 are separately configured for the DCI transmitted from TRP #0 (for example, option 2 of the first aspect) is assumed. In this case, different count values may be configured for the DAI field for TRP #0 (or, PDSCH 0) and the DAI field for TRP #1 (or, PDSCH 1). For example, the DAI value of the DAI field for TRP #0 included in the DCI transmitted in slot #n−2 may be 4, and the DAI value of the DAI field for TRP #1 may be 1.

[Case 2]

In case 2, the following configuration is assumed.

One DAI field is used for the plurality of TRPs

The number of cells (or, CCs) configured for each of the plurality of TRPs is 2

FIG. 7 shows an example of count control of the DAI of a case in which single PDCCH base is applied in multi-TRP transmission. FIG. 7 shows a case in which the plurality of cells (here, CC 0 and CC 1) are configured for each of TRP #0 and TRP #1, PDSCH 0 is transmitted from TRP #0, and PDSCH 1 is transmitted from TRP #1.

PDSCH 0 and PDSCH 1 may be scheduled using one PDCCH (for example, DCI). The PDCCH may be transmitted from a certain TRP (for example, TRP #0). The format of the DCI transmitted on the PDCCH may be a case in which the first DCI format (hereinafter also referred to as DCI format 1_0) is applied, or the second DCI format (hereinafter also referred to as DCI format 1_1).

When DCI format 1_0 is applied, only the counter DAI field may be configured, without the total DAI field being configured in the DAI field. When DCI format 1_1 is applied, the total DAI and the counter DAI may be configured for the DAI field.

Figure 7A:
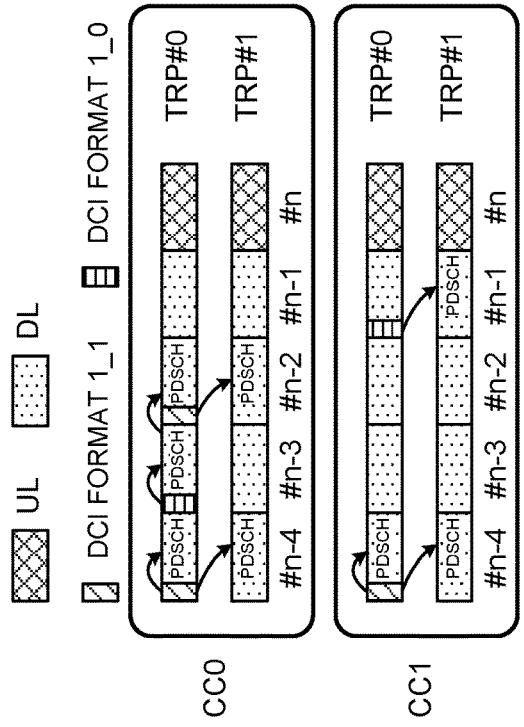
FIG. 7A to FIG. 7C are each a diagram to show another example of count control of the DAI according to the second aspect.

Here, a case in which, in CC 0, PDSCH 0 is transmitted in each of slots #n−4, #n−3, and #n−2 of TRP #0, and PDSCH 1 is transmitted in each of slots #n−4 and #n−2 of TRP #1 is shown (see FIG. 7A). A case in which the DCI for scheduling the PDSCHs transmitted in slot #n−4 and slot #n−2 is DCI format 1_1 and the DCI for scheduling the PDSCH transmitted in slot #n−3 is DCI format 1_0 is shown.

A case in which, in CC 1, PDSCH 0 is transmitted in slot #n−4 of TRP #0, and PDSCH 1 is transmitted in each of slots #n−4 and #n−1 of TRP #1 is shown. A case in which the DCI for scheduling the PDSCH transmitted in slot #n−4 is DCI format 1_1 and the DCI for scheduling the PDSCH transmitted in slot #n−1 is DCI format 1_0 is shown.

A case in which feedback timing of the HARQ-ACKs for the PDSCHs transmitted in slots #n−4 to #n−1 is configured to slot #n is assumed.

Figure 7B:
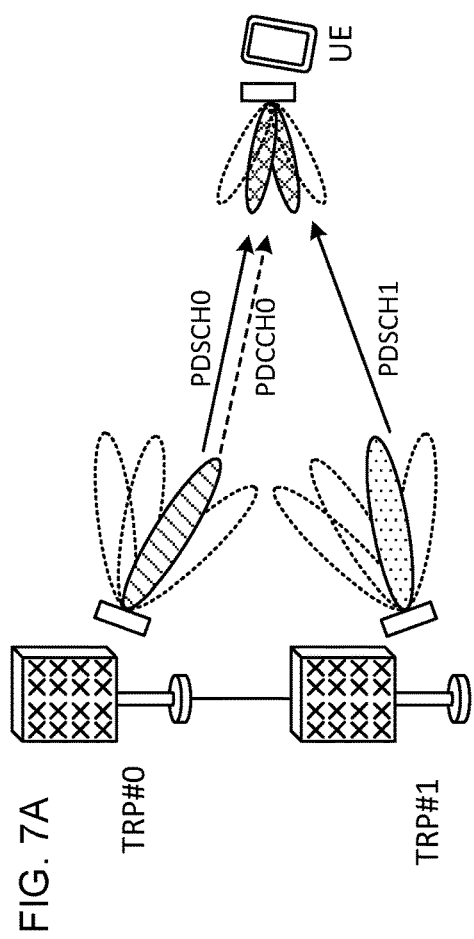

FIG. 7B shows an example of a case in which the counter DAI and the total DAI are separately counted between the plurality of TRPs (for example, (3) of the above). In this case, the counter DAI may be counted first in ascending order of the serving cell index, and then in ascending order of the PDCCH monitoring occasion index m (first in ascending order of serving cell index and then in ascending order of PDCCH monitoring occasion index m).

The total DAI corresponds to a total number of pairs of the serving cell and the PDCCH monitoring occasion ({serving cell, PDCCH monitoring occasion}-pair(s)). The pair of the serving cell and the PDCCH monitoring occasion may correspond to the TRP in which PDSCH reception (or SPS PDSCH release) related to DCI format 1_0 or DCI format 1_1 is present. The total DAI may be a total number up to the current PDCCH monitoring occasion m.

In FIG. 7B, the value of the counter DAI is configured according to certain order for each TRP. Here, a case in which the DAI field (one DAI field) for TRP 0 and TRP 1 are configured for the DCI transmitted from TRP #0 in a shared manner (for example, option 1 of the first aspect) is shown.

In this case, the base station may configure the count value and the total DAI value with a certain TRP being used as a reference, in the slot for scheduling the PDSCHs in both of TRP #0 and TRP #1. For example, the counter DAI value and the total DAI value included in DCI 3 for scheduling PDSCH 0 and PDSCH 1 transmitted in slot #n−2 may be configured to be 4 (with TRP #0 having a large number of PDSCH transmissions being used as a reference).

Here, a case in which one DAI field is used for the plurality of TRPs has been shown. However, this is not restrictive. For example, a case in which the DAI fields for TRP #0 and TRP #1 are separately configured for the DCI transmitted from TRP #0 (for example, option 2 of the first aspect) is assumed. In this case, different count values may be configured for the DAI field for TRP #0 (or, PDSCH 0) and the DAI field for TRP #1 (or, PDSCH 1). For example, the counter DAI value and the total DAI value of the DAI field for TRP #0 included in the DCI transmitted in slot #n−2 may be set to 4, and the counter DAI value and the total DAI value of the DAI field for TRP #1 may be set to 3.

Figure 7C:
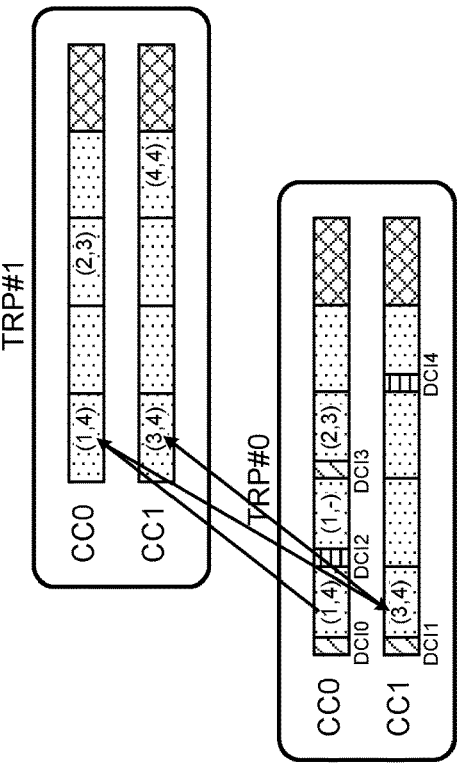

FIG. 7C shows an example of a case in which the counter DAI is jointly counted between the plurality of TRPs (for example, (4) of the above). In this case, the counter DAI may be counted first in ascending order of the TRP index, then in ascending order of the serving cell index, and then in ascending order of the PDCCH monitoring occasion index m (first in ascending order of TRP/panel index and then in ascending order of serving cell index and then in ascending order of PDCCH monitoring occasion index m).

Alternatively, the counter DAI may be counted first in ascending order of the serving cell index, then in ascending order of the TRP index, and then in ascending order of the PDCCH monitoring occasion index m (first in ascending order of serving cell index and then in ascending order of TRP/panel index and then in ascending order of PDCCH monitoring occasion index m).

Alternatively, even when the counter DAI is jointly counted between the plurality of TRPs, the count may be controlled in a manner similar to FIG. 7B when one DAI field (at least one of the counter DAI field and the total DAI field) is shared between the plurality of TRPs. In other words, for each TRP, the counter DAI may be counted first in ascending order of the serving cell index, and then in ascending order of the PDCCH monitoring occasion index m.

The total DAI corresponds to a total number of pairs of the TRP, the serving cell, and the PDCCH monitoring occasion ({TRP, serving cell, PDCCH monitoring occasion}-pair(s)). The pair of the TRP, the serving cell, and the PDCCH monitoring occasion may correspond to the TRP in which PDSCH reception (or SPS PDSCH release) related to DCI format 1_0 or DCI format 1_1 is present. The total DAI may be a total number up to the current PDCCH monitoring occasion m.

FIG. 7C shows a case in which the DAI field (one DAI field) for TRP 0 and TRP 1 are configured for the DCI transmitted from TRP #0 in a shared manner (for example, option 1 of the first aspect).

In this case, the same counter DAI value may be configured for the DCI in the slot scheduled in both of TRP #0 and TRP #1 in a certain CC. Here, a case in which the DAI value included in the DCI is determined with one of the TRPs (for example, TRP #0) being used as a reference is shown.

When the PDSCHs are transmitted in the plurality of TRPs in the same slot of a certain CC, the UE may determine that the DAI value corresponding to one of the PDSCHs is a different value (for example, DAI value+1). For example, the UE may determine that the DAI value for PDSCH 1 transmitted in slot #n−4 of TRP #1 in CC 0 is 2. When the PDSCHs are transmitted in the plurality of TRPs in the same slot, the UE may determine that the increment of the DAI value included in the next DCI (here, DCI 1) is 2. In contrast, when the PDSCHs are transmitted in one TRP in the same slot, the UE may determine that the increment of the DAI value included in the DCI to be transmitted next is 1.

Here, a case in which one DAI field is used for the plurality of TRPs has been shown. However, this is not restrictive. For example, a case in which the DAI fields for TRP #0 and TRP #1 are separately configured for the DCI transmitted from TRP #0 (for example, option 2 of the first aspect) is assumed. In this case, different count values may be configured for the DAI field for TRP #0 (or, PDSCH 0) and the DAI field for TRP #1 (or, PDSCH 1). For example, the counter DAI value of the DAI field for TRP #0 included in the DCI transmitted in slot #n−4 of TRP #1 in CC 0 may be 1, and the DAI value of the DAI field for TRP #1 may be 2.

<Multi-PDCCH Base>
[Case 3]
In case 3, the following configuration is assumed.
A plurality of DAI fields (DAI field corresponding to each TRP) are used for the plurality of TRPs
The number of cells (or, CCs) configured for each of the plurality of TRPs is 2

Figure 8A:
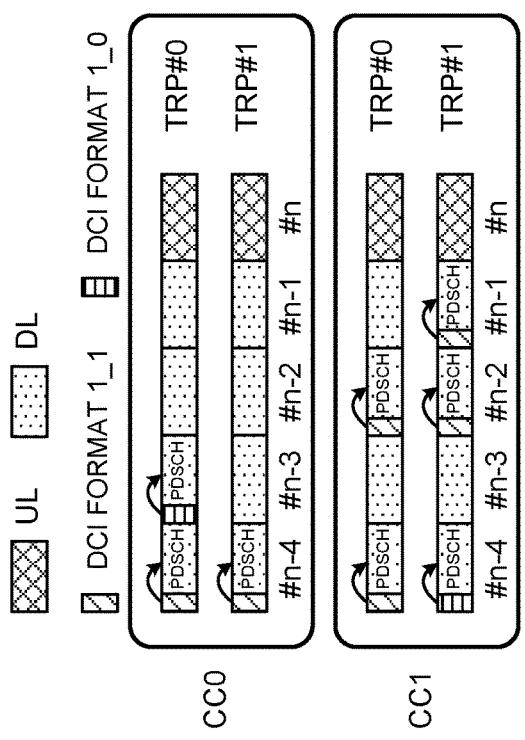
FIG. 8A and FIG. 8B are each a diagram to show another example of count control of the DAI according to the second aspect.
Figure 8A:
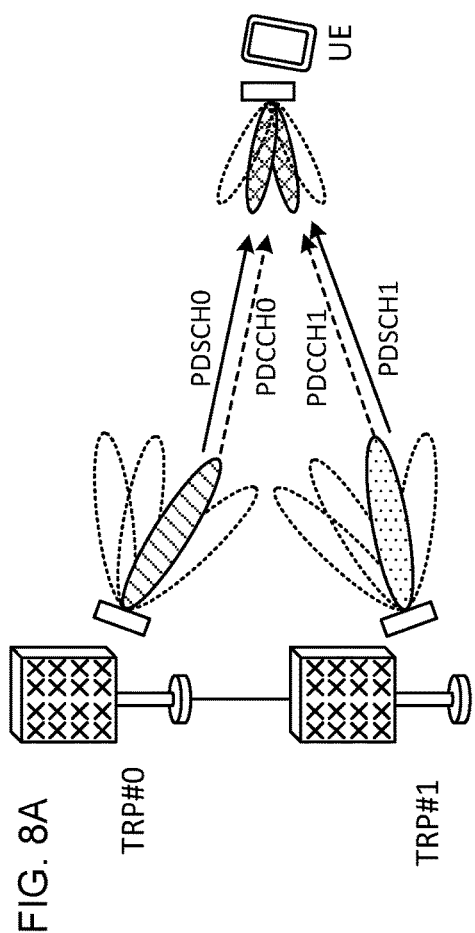

FIG. 8 shows an example of count control of the DAI of a case in which multi-PDCCH base is applied in multi-TRP transmission. FIG. 8 shows a case in which two cells (here, CC 0 and CC 1) are configured for TRP #0 and TRP #1, PDSCH 0 is transmitted from TRP #0, and PDSCH 1 is transmitted from TRP #1.

PDSCH 0 and PDSCH 1 may be scheduled on PDCCHs (for example, DCIs) that are separate from each other. For example, PDSCH 0 may be scheduled on PDCCH 0 transmitted from TRP #0, and PDSCH 1 may be scheduled on PDCCH 1 transmitted from TRP #1.

Here, a case in which, in CC 0, PDSCH 0 is transmitted in each of slots #n−4 and #n−3 of TRP #0, and PDSCH 1 is transmitted in slot #n−4 of TRP #1 is shown (see FIG. 8A). A case in which the DCI for scheduling the PDSCH transmitted in slot #n−4 of each of TRP #0 and TRP #1 is DCI format 1_1 and the DCI for scheduling the PDSCH transmitted in slot #n−3 of TRP #0 is DCI format 1_0 is shown.

A case in which, in CC 1, PDSCH 0 is transmitted from each of slots #n−4 and #n−2 of TRP #0, and PDSCH 1 is transmitted from each of slots #n−4, #n−2, and #n−1 of TRP #1 is shown. A case in which the DCI for scheduling the PDSCH transmitted in slot #n−4 of TRP #1 is DCI format 1_0, and the other DCI is DCI format 1_1 is shown.

A case in which feedback timing of the HARQ-ACKs for the PDSCHs transmitted in slots #n−4 to #n−1 is configured to slot #n is assumed.

Figure 8B:
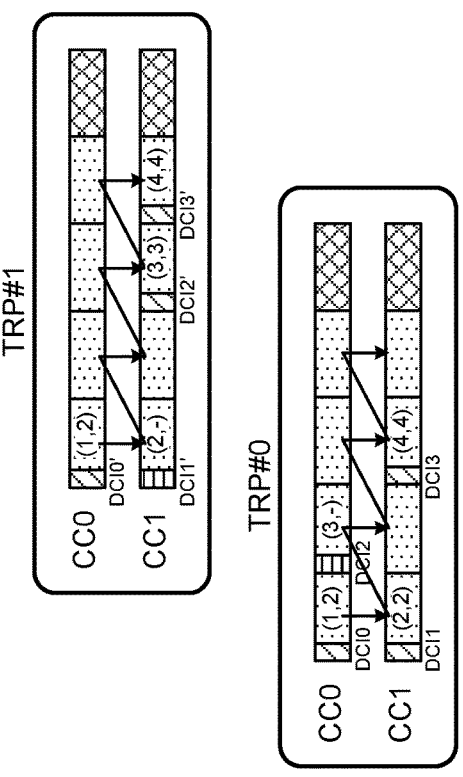

FIG. 8B shows an example of a case in which the counter DAI and the total DAI are separately counted between the plurality of TRPs (for example, (3) of the above). In this case, the counter DAI may be counted first in ascending order of the serving cell index, and then in ascending order of the PDCCH monitoring occasion index m (first in ascending order of serving cell index and then in ascending order of PDCCH monitoring occasion index m).

The total DAI corresponds to a total number of pairs of the serving cell and the PDCCH monitoring occasion ({serving cell, PDCCH monitoring occasion}-pair(s)). The pair of the serving cell and the PDCCH monitoring occasion may correspond to the TRP in which PDSCH reception (or SPS PDSCH release) related to DCI format 1_0 or DCI format 1_1 is present. The total DAI may be a total number up to the current PDCCH monitoring occasion m.

In FIG. 8B, the value of the counter DAI is configured according to certain order for each TRP. Here, the counter DAIs are separately configured in PDCCH 0 and PDCCH 1 corresponding to TRPs that are different from each other.

Note that FIG. 8B shows a case in which the counter DAI field and the total DAI field are configured for each of the plurality of PDCCHs. However, this may be used in a case of application of a single PDCCH. In this case, the counter DAI field of the plurality of PDCCHs may be interpreted as the first counter DAI field and the second counter DAI field of one PDCCH. The total DAI field of the plurality of PDCCHs may be interpreted as the first total DAI field and the second total DAI field of one PDCCH.

Figure 9B:
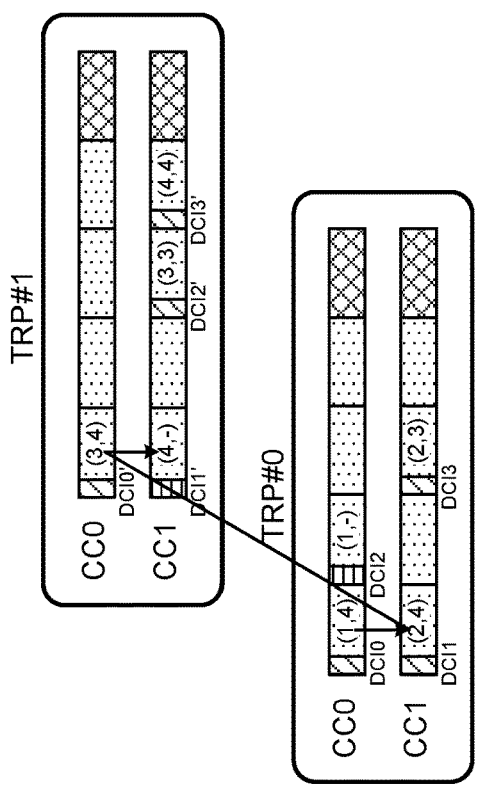
FIG. 9A and FIG. 9B are each a diagram to show another example of count control of the DAI according to the second aspect.
Figure 9A:
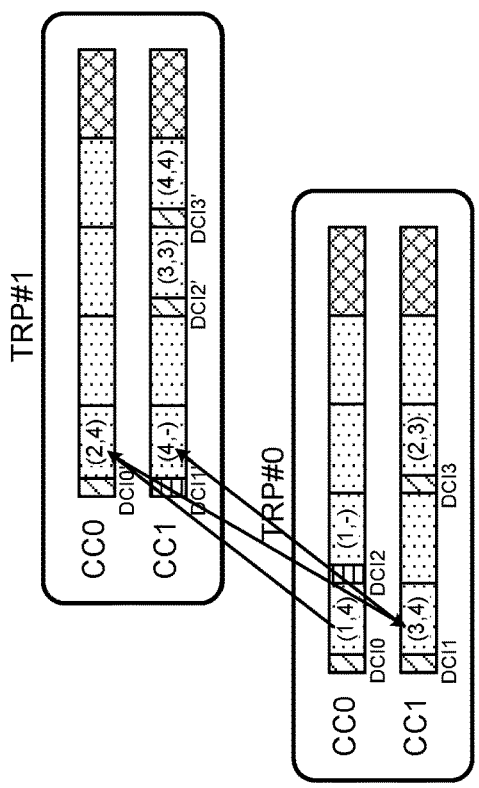

FIG. 9 shows an example of a case in which the counter DAI is jointly counted between the plurality of TRPs (for example, (4) of the above). In this case, as shown in FIG. 9A, the counter DAI may be counted first in ascending order of the TRP index, then in ascending order of the serving cell index, and then in ascending order of the PDCCH monitoring occasion index m (first in ascending order of TRP/panel index and then in ascending order of serving cell index and then in ascending order of PDCCH monitoring occasion index m).

Alternatively, as shown in FIG. 9B, the counter DAI may be counted first in ascending order of the serving cell index, then in ascending order of the TRP index, and then in ascending order of the PDCCH monitoring occasion index m (first in ascending order of serving cell index and then in ascending order of TRP/panel index and then in ascending order of PDCCH monitoring occasion index m).

The total DAI corresponds to a total number of pairs of the TRP, the serving cell, and the PDCCH monitoring occasion ({TRP, serving cell, PDCCH monitoring occasion}-pair(s)). The pair of the TRP, the serving cell, and the PDCCH monitoring occasion may correspond to the TRP in which PDSCH reception (or SPS PDSCH release) related to DCI format 1_0 or DCI format 1_1 is present. The total DAI may be a total number up to the current PDCCH monitoring occasion m.

In FIG. 9, the value of the counter DAI is configured according to certain order for each TRP. Here, the counter DAIs are separately configured in PDCCH 0 and PDCCH 1 corresponding to TRPs that are different from each other.

Note that FIG. 9 shows a case in which the counter DAI field and the total DAI field are configured for each of the plurality of PDCCHs. However, this may be used in a case of application of a single PDCCH. In this case, the counter DAI field of the plurality of PDCCHs may be interpreted as the first counter DAI field and the second counter DAI field of one PDCCH. The total DAI field of the plurality of PDCCHs may be interpreted as the first total DAI field and the second total DAI field of one PDCCH.

<Selection of Count Method of DAI>
Whether the counter DAI and the total DAI are separately counted (separately) or jointly counted (jointly) between the plurality of TRPs may be configured from the base station to the UE. For example, the base station may configure, for the UE, a count method of at least one of the counter DAI and the total DAI by using higher layer signaling.

When the DAI is jointly counted between the plurality of TRPs, the UE can determine a detection error of the DCI (or, the PDCCH) in the TRP domain. In contrast, when the DAI is separately counted between the plurality of TRPs, delay of scheduling of the PDSCH can be reduced. This is because, when the DAI is separately counted between the TRPs, knowing of scheduling information of other TRPs is not required in the determination of the DAI between the plurality of TRPs.

Thus, by flexibly selecting the count method of the DAI, communication can be appropriately controlled according to delay of the backhaul link between the TRPs (or, the base stations) or a communication environment.

When the count method of the DAI is not configured in a higher layer, the UE may assume any one of the count methods (for example, joint count method). In this manner, the detection error of the DCI in the TRP domain can be effectively reduced.

Alternatively, when the count method of the DAI is not configured in a higher layer, the UE may assume any one of the count methods (for example, separate count method). In this manner, delay of scheduling of the PDSCH can be effectively reduced.

<UE Capability Information>

Whether the UE supports a dynamic HARQ-ACK codebook or a semi-static HARQ-ACK codebook in Rel. 15 may be reported as UE capability information.

When there is a report indicating that the UE supports the dynamic HARQ-ACK codebook in conformity with Rel. 15 and supports communication using multi-TRPs (at least one of single PDCCH base and multi-PDCCH base), the dynamic HARQ-ACK using multi-TRPs may be applied.

When there is a report indicating that the UE supports the semi-static HARQ-ACK codebook in conformity with Rel. 15 and supports communication using multi-TRPs (at least one of single PDCCH base and multi-PDCCH base), the dynamic HARQ-ACK using a semi-static TRP may be applied.

Whether or not the UE supports the dynamic HARQ-ACK codebook or the semi-static HARQ-ACK codebook in Rel. 16 or later versions may be notified as new UE capability information.

When there is a report indicating that the UE supports the dynamic HARQ-ACK codebook in conformity with Rel. 16 and supports communication using multi-TRPs (at least one of single PDCCH base and multi-PDCCH base), the dynamic HARQ-ACK using multi-TRPs may be applied.

When there is a report indicating that the UE supports the semi-static HARQ-ACK codebook in conformity with Rel. 16 and supports communication using multi-TRPs (at least one of single PDCCH base and multi-PDCCH base), the dynamic HARQ-ACK using a semi-static TRP may be applied.

(Third Aspect)

In a third aspect, generation of the HARQ-ACK codebook (for example, dynamic HARQ-ACK codebook construction) of a case in which the dynamic HARQ-ACK codebook is applied in the multi-TRP scenario will be described.

In the multiple TRP scenario, when type 2 (for example, the dynamic HARQ-ACK codebook) is configured as an HARQ-ACK codebook type, the UE controls the joint ACK/NACK feedback, based on a certain rule.

The UE may control generation of the HARQ-ACK codebook, according to the count method of the counter DAI value and the total DAI value between the plurality of TRPs (jointly or separately), and the configuration method of the counter DAI field and total DAI field in the DCI (in a shared manner or separately).

For example, the UE may control transmission of the HARQ-ACK (for example, generation of the HARQ-ACK codebook), based on at least one of the count value of DL assignment jointly controlled between the plurality of transmission/reception points, the count value of the DL assignment separately controlled between the plurality of transmission/reception points, and indices of the transmission/reception points.

In the following, a generation method of the HARQ-ACK codebook that can be applied by the UE will be described. Note that the UE may select and apply at least one of the following HARQ-ACK codebook generation (1) to (3). Alternatively, HARQ-ACK codebook generation (1) to (3) may be applied in combination, or another HARQ-ACK codebook generation may be applied.

<HARQ-ACK Codebook Generation (1)>

The UE generates the HARQ-ACK codebook by using at least one of the counter DAI value and the total DAI value.

HARQ-ACK codebook generation (1) can be suitably applied to a case in which the dynamic HARQ-ACK codebook is configured for the UE, and the counter DAI or the counter DAI and the total DAI are jointly counted between the plurality of TRPs. As a matter of course, this is not restrictive, and this may be applied to another case.

<<Single PDCCH Base>>

FIG. 10 shows an example of HARQ-ACK codebook generation of a case in which the DAI and the total DAI are jointly counted between the TRPs when single PDCCH base, by which one PDCCH (or, DCI) is transmitted from the plurality of TRPs, is applied. Scheduling of the PDSCH, control of the counter DAI value and the total DAI value, and the like are similar to those of the contents described with reference to FIG. 7C in the above. In the following description, a case in which slots #n−4 to #n−1 respectively correspond to monitoring occasions 0 to 3 is assumed.

The UE determines mapping order (HARQ-ACK codebook order) of the HARQ-ACK bits for each PDSCH, based on the counter DAI value of the DCI for scheduling each PDSCH.

Figure 10A:
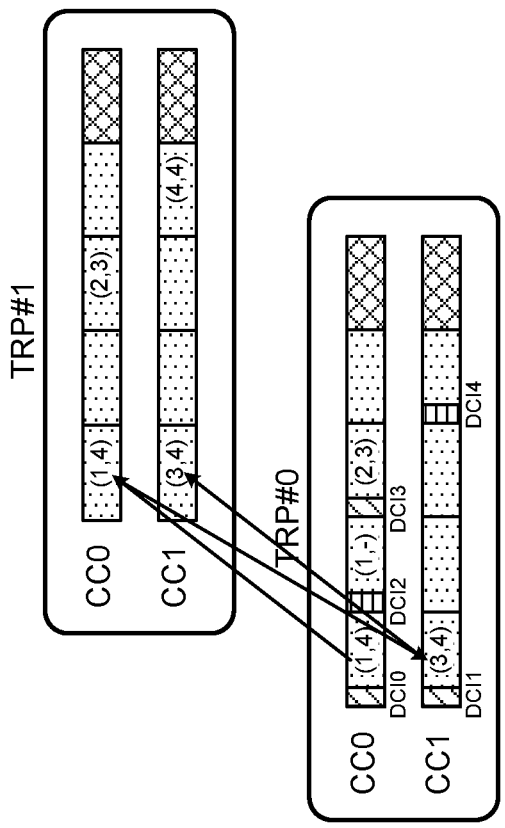
FIG. 10A and FIG. 10B are each a diagram to show an example of HARQ-ACK codebook generation according to a third aspect.

FIG. 10A shows a case in which the counter DAI field is configured for the plurality of TRPs in a shared manner (the count value corresponding to each TRP is reported by using one counter DAI field). In this case, the same counter DAI value is configured for PDSCH 0 and PDSCH 1 that are transmitted at the same timing (for example, a slot) in TRP #0 and TRP #1. For example, the counter DAI value corresponding to PDSCH 0 transmitted from TRP #0 and PDSCH 1 transmitted from TRP #1 in slot #n−4 of CC 0 is 1.

Figure 10B:
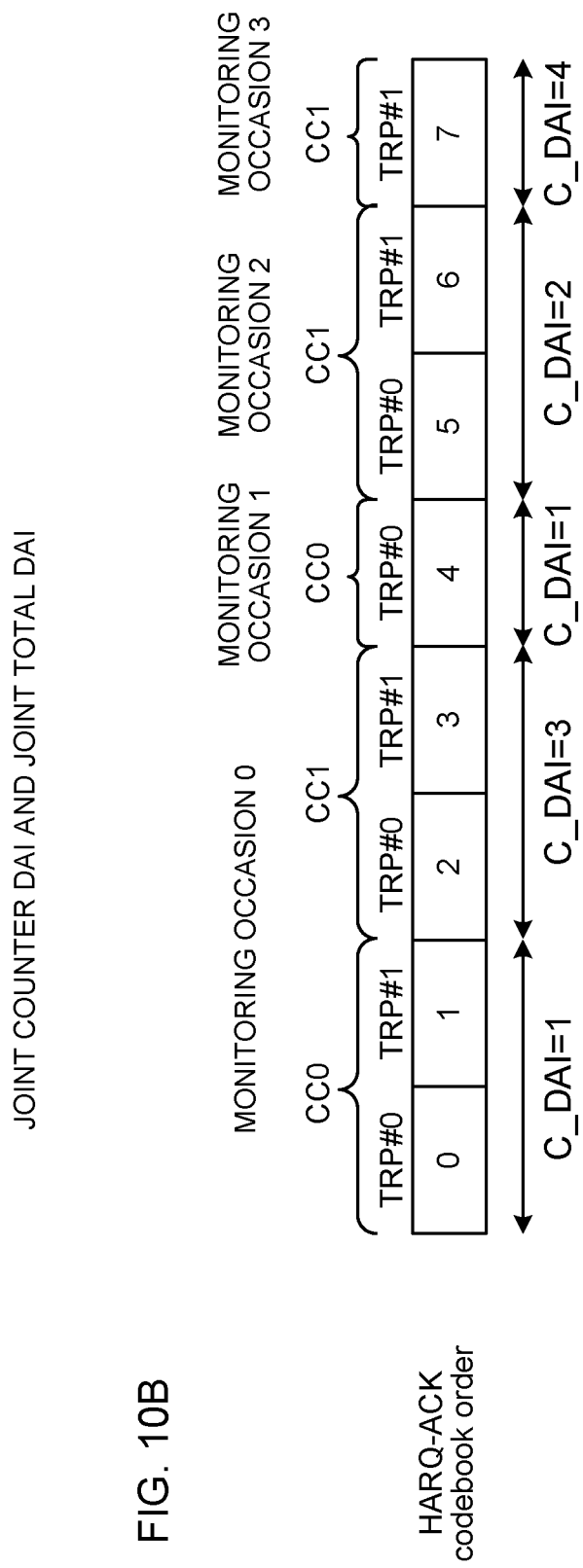

When the counter DAI value is the same between the plurality of TRPs, the UE may determine mapping of the HARQ-ACKs, based on a certain condition (see FIG. 10B). The certain condition may be the TRP index. FIG. 10B shows a case in which the UE performs mapping to the HARQ-ACKs of the same counter DAI value from the one having the smallest TRP index. This is not restrictive, and mapping may be performed from the one having the largest TRP index.

<<Multi-PDCCH Base>>

FIG. 11 shows an example of HARQ-ACK codebook generation of a case in which the DAI and the total DAI are jointly counted between the TRPs when multi-PDCCH base, by which a plurality of PDSCHs (or, DCIs) are transmitted from the plurality of TRPs, is applied. Scheduling of the PDSCH, control of the counter DAI value and the total DAI value, and the like are similar to those of the contents described with reference to FIG. 9A in the above.

Figure 11A:
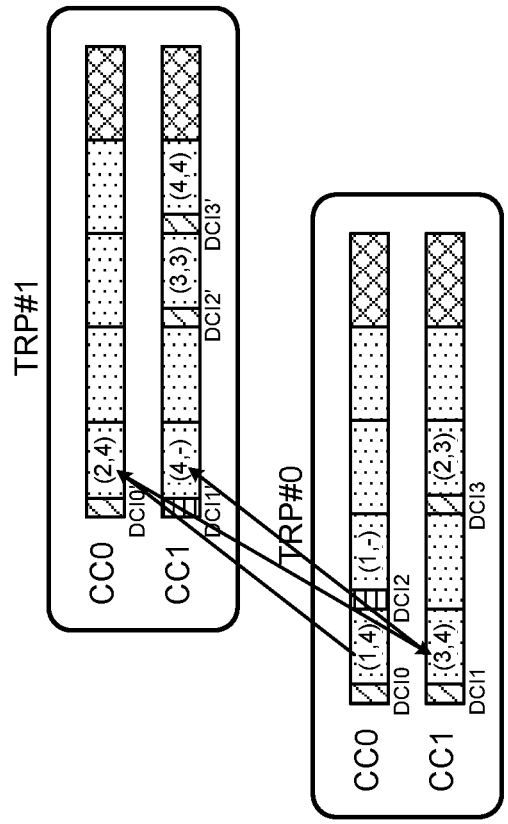
FIG. 11A and FIG. 11B are each a diagram to show another example of HARQ-ACK codebook generation according to the third aspect.

In FIG. 11A, the counter DAI is counted first in ascending order of the TRP index, then in ascending order of the serving cell index, and then in ascending order of the PDCCH monitoring occasion index. The counter DAI value is expressed by using 1 to 4, and when the number of corresponding PDSCHs is more than four, the counter DAI value may be expressed as in 1→2→3→4→1 . . . .

In FIG. 11A, the counter DAI value is specified for each of the PDSCHs transmitted in each of the TRPs by DCIs that are different from each other. Based on count order (for example, the counter DAI value and the total DAI value) of each of the PDSCHs (or, HARQ-ACK corresponding to each of the PDSCHs), the UE determines mapping order of the HARQ-ACKs, and generates the HARQ-ACK codebook (see FIG. 11B).

Figure 11B:
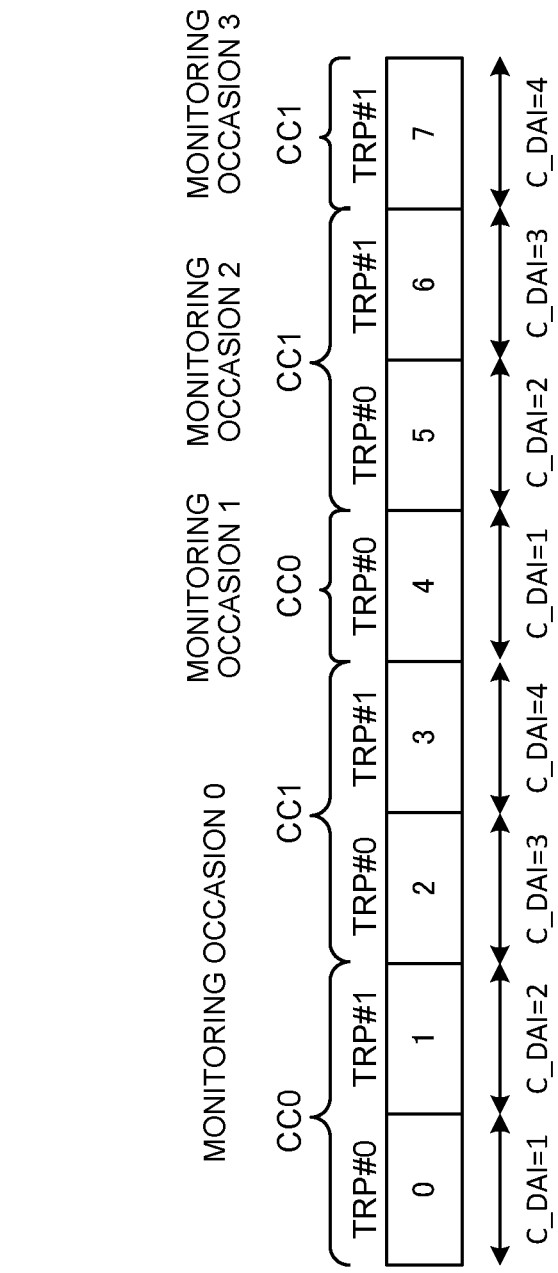

FIG. 11B shows a case in which counting is performed first in ascending order of the TRP index, and then in ascending order of the serving cell index. However, this is not restrictive. Counting may be performed first in ascending order of the serving cell index.

Figure 12A:
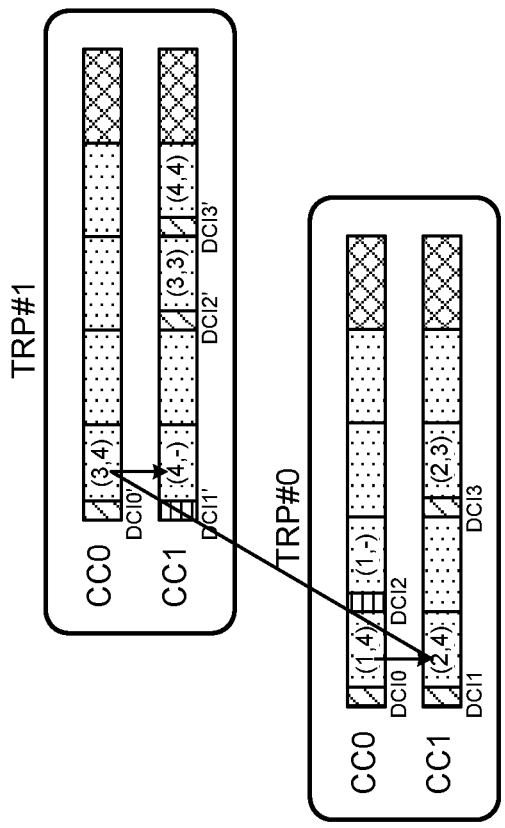
FIG. 12A and FIG. 12B are each a diagram to show another example of HARQ-ACK codebook generation according to the third aspect.
Figure 12B:
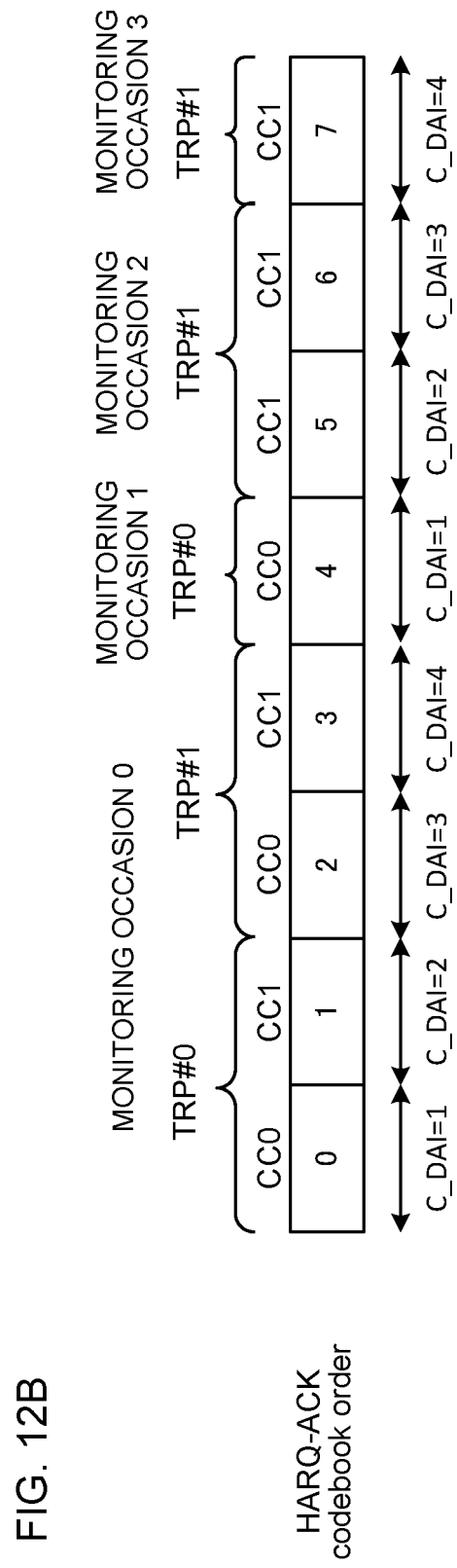

FIG. 12A shows a case in which the counter DAI is counted first in ascending order of the serving cell index, then in ascending order of the TRP index, and then in ascending order of the PDCCH monitoring occasion index. Based on count order (for example, the counter DAI value and the total DAI value) of each of the PDSCHs (or, HARQ-ACK corresponding to each of the PDSCHs), the UE determines mapping order of the HARQ-ACKs, and generates the HARQ-ACK codebook (see FIG. 12B).

In this manner, by controlling the mapping order of the HARQ-ACKs based on the counter DAI, the HARQ-ACK codebook can be appropriately generated even when the HARQ-ACKs are jointly fed back between the plurality of TRPs. By jointly counting the counter DAI value and the total DAI value between the plurality of TRPs, generation of the HARQ-ACK codebook can be simplified when the HARQ-ACKs are jointly fed back between the plurality of TRPs.

<HARQ-ACK Codebook Generation (2)>

The UE determines the HARQ-ACK codebook (also referred to as a HARQ-ACK sub-codebook or a sub-codebook) for each TRP, and combines the HARQ-ACK sub-codebooks to generate one HARQ-ACK codebook.

HARQ-ACK codebook generation (2) can be suitably applied to a case in which the dynamic HARQ-ACK codebook is configured for the UE, and the counter DAI or the counter DAI and the total DAI are separately counted between the plurality of TRPs. Alternatively, HARQ-ACK codebook generation (2) can be suitably applied to a case in which at least one of the counter DAI field and the total DAI field is configured in a shared manner between the plurality of TRPs. As a matter of course, this is not restrictive, and this may be applied to another case.

The UE may control generation of the HARQ-ACK codebook by using the following step 1 and step 2.

Step 1: Determine HARQ-ACK sub-codebook for each TRP
Step 2: Combine HARQ-ACK sub-codebook of each TRP to generate one HARQ-ACK codebook In step 1, the UE may determine the HARQ-ACK sub-codebook, based on at least one of the counter DAI value and the total DAI value configured for each TRP.

In step 2, the UE controls combination of the HARQ-ACK sub-codebooks of respective TRPs, based on a certain condition. For example, the UE may perform control so that the HARQ-ACK sub-codebook having a small TRP index is preferentially mapped. Alternatively, the UE may perform control so that the HARQ-ACK sub-codebook having a large TRP index is preferentially mapped.

<<Single PDCCH Base>>

FIG. 13 shows an example of a case in which the HARQ-ACK sub-codebooks determined for respective TRPs are combined to generate the HARQ-ACK codebook when single PDCCH base, by which one PDCCH (or, DCI) is transmitted from the plurality of TRPs, is applied. Scheduling of the PDSCH, control of the counter DAI value and the total DAI value, and the like are generally similar to those of the contents described with reference to FIG. 7B in the above.

The UE determines the HARQ-ACK sub-codebook of each of the TRPs. The UE may determine the HARQ-ACK sub-codebook, based on the counter DAI value and the total DAI value configured to be associated with each of the TRPs (see FIG. 13B).

Figure 13A:
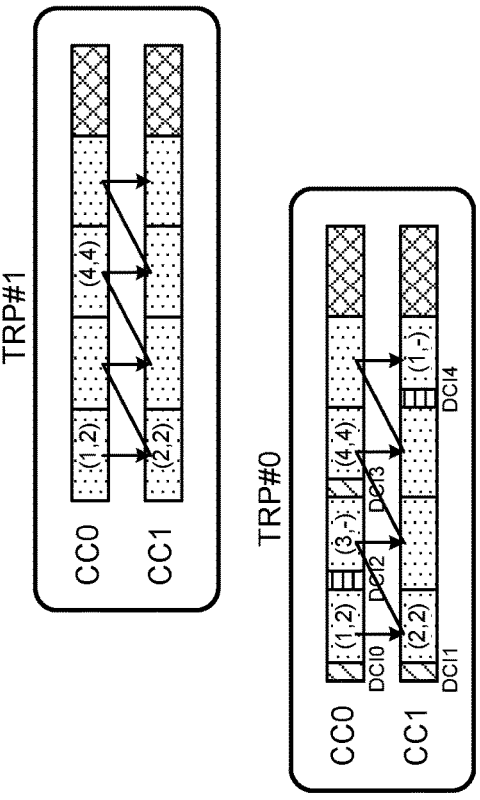
FIG. 13A and FIG. 13B are each a diagram to show another example of HARQ-ACK codebook generation according to the third aspect.
Figure 13B:
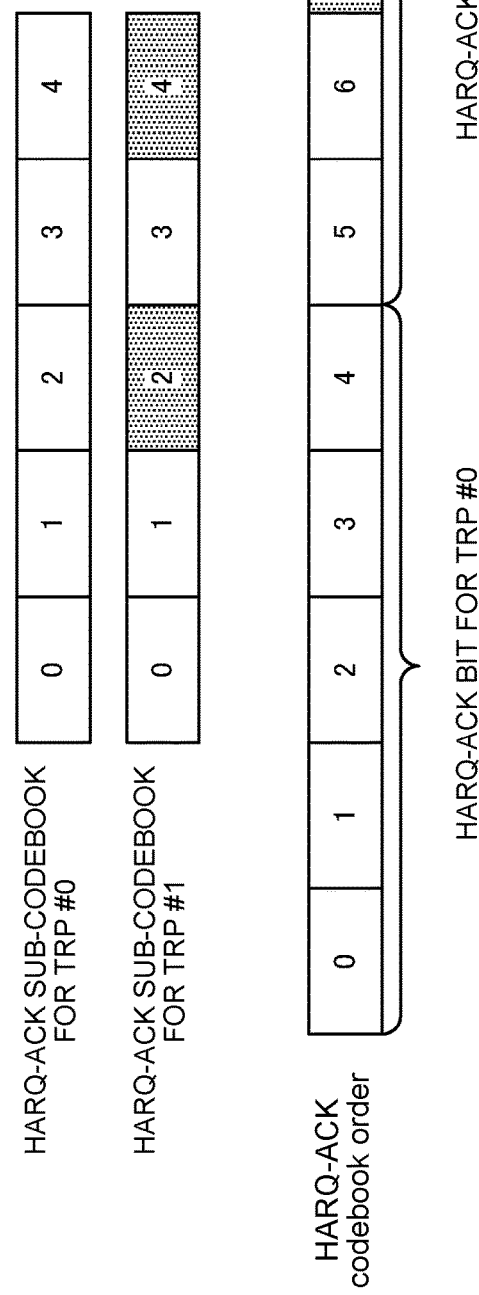

FIG. 13A shows a case in which the counter DAI field is configured for the plurality of TRPs in a shared manner (the count value corresponding to each TRP is reported by using one counter DAI field). Thus, even when the PDSCH is scheduled in TRP #0 and the PDSCH is not scheduled in TRP #1, the counter DAI value corresponding to TRP #1 is incremented.

For example, in FIG. 13A, the PDSCH corresponding to counter DAI value 3 corresponding to the PDSCH transmitted from TRP #0 in slot #n–3 of CC 0 and counter DAI value 1 corresponding to the PDSCH transmitted from TRP #0 in slot #n–1 of CC 1 is not present in TRP #1. In this case, in TRP #1, the UE may determine the HARQ-ACK bits corresponding to the counter DAI values 3 and 1 as NACK (see FIG. 13B).

Alternatively, in TRP #1, the HARQ-ACK bits corresponding to the counter DAI values 3 and 1 may not be included in the HARQ-ACK codebook.

The UE combines the HARQ-ACK sub-codebook corresponding to TRP #0 and the HARQ-ACK codebook corresponding to TRP #1 to generate one HARQ-ACK codebook. Here, a case in which the order of the HARQ-ACK bits is determined by prioritizing the HARQ-ACK codebook corresponding to TRP #0 having a small TRP index is shown.

FIG. 13 shows a case in which the PDSCH of TRP #0 is scheduled by using the DCI (for example, DCI format 1_0) transmitted in TRP #0 in a certain slot. However, this is not restrictive. The PDSCH of TRP #1 may be scheduled by using the DCI (for example, DCI format 1_0) transmitted in TRP #0 (see FIG. 14A).

Figure 14A:
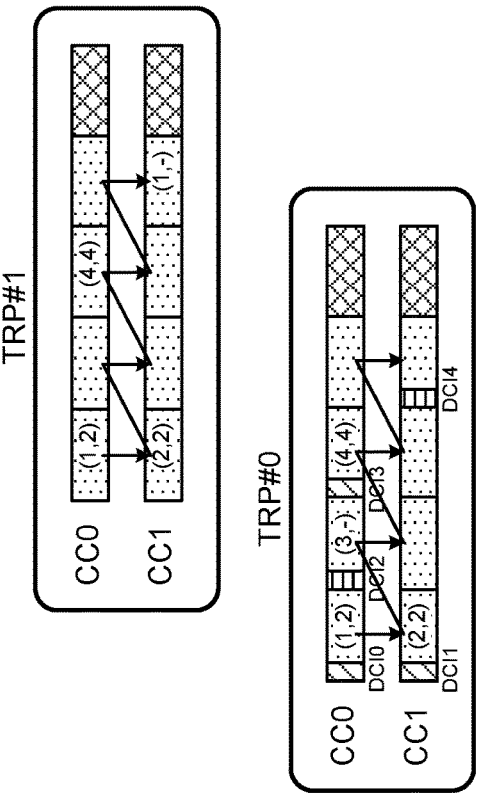
FIG. 14A and FIG. 14B are each a diagram to show another example of HARQ-ACK codebook generation according to the third aspect.
Figure 14B:
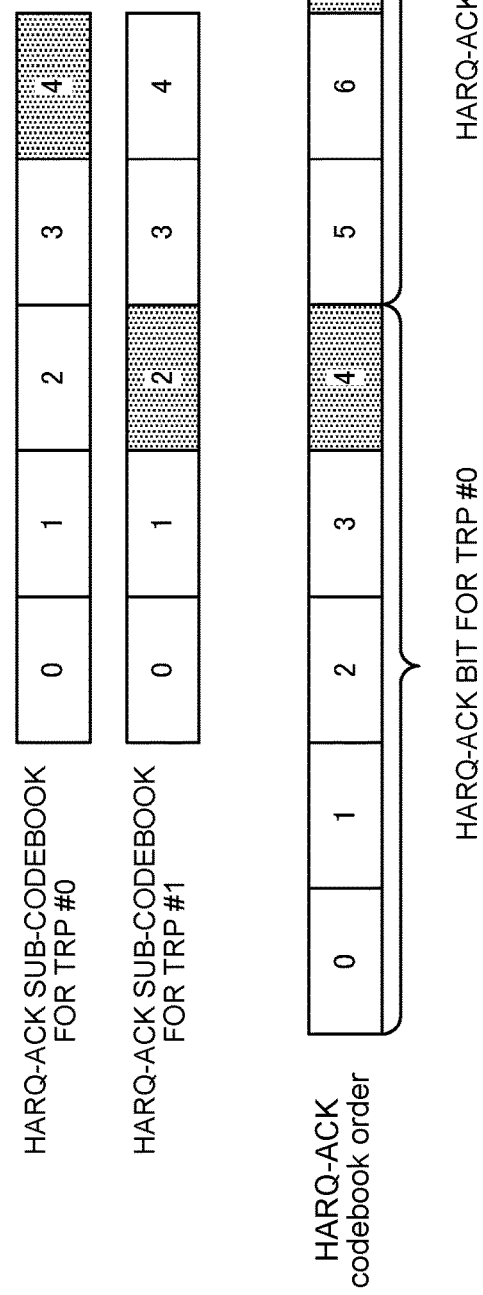

FIG. 14A shows a case in which the PDSCH is scheduled in TRP #1 by using the DCI (or, the PDCCH) transmitted in TRP #0 in slot #n–1 of CC 1. In this case, the PDSCH corresponding to counter DAI value 1 corresponding to the PDSCH transmitted from TRP #1 in slot #n–1 of CC 1 is not present in TRP #0. In this case, in TRP #0, the UE may determine the HARQ-ACK bits corresponding to the counter DAI value 1 as NACK (see FIG. 14B).

<<Multi-PDCCH Base>>

FIG. 15 shows an example of HARQ-ACK codebook generation of a case in which the DAI and the total DAI are separately counted between the TRPs when multi-PDCCH base, by which a plurality of PDCCHs (or, DCI) are transmitted from the plurality of TRPs, is applied. Scheduling of the PDSCH, control of the counter DAI value and the total DAI value, and the like are similar to those of the contents described with reference to FIG. 8B in the above.

Figure 15A:
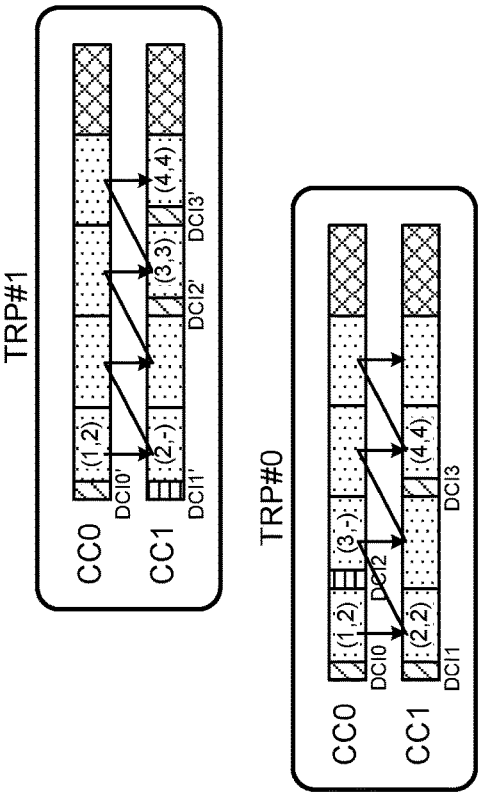
FIG. 15A and FIG. 15B are each a diagram to show another example of HARQ-ACK codebook generation according to the third aspect.
Figure 15B:
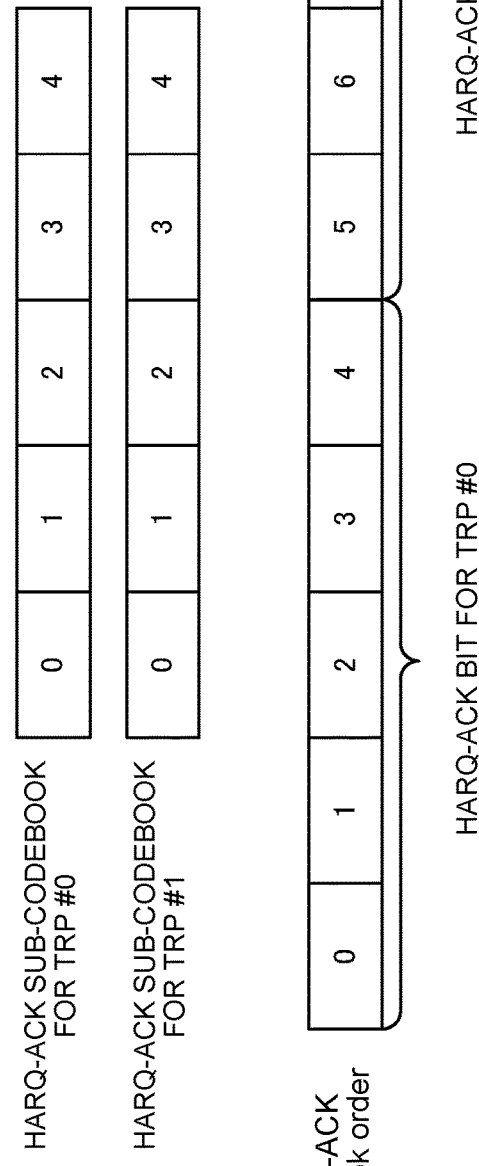

In FIG. 15A, the counter DAI value and the total DAI value included in the DCI (or, the PDCCH) transmitted in each of the TRPs are specified. Count of the counter DAI value and the total DAI value is controlled for each of the TRPs. The UE may determine the HARQ-ACK sub-codebook, based on the counter DAI value and the total DAI value configured to be associated with each of the TRPs (see FIG. 15B).

Next, the UE combines the HARQ-ACK sub-codebook corresponding to TRP #0 and the HARQ-ACK codebook corresponding to TRP #1 to generate one HARQ-ACK codebook. Here, a case in which the order of the HARQ-ACK bits is determined by prioritizing the HARQ-ACK codebook corresponding to TRP #0 having a small TRP index is shown.

By determining the HARQ-ACK sub-codebook for each TRP and then combining the HARQ-ACK sub-codebooks to determine one HARQ-ACK codebook, the order of the HARQ-ACKs can be appropriately controlled even when the counter value is separately controlled between the plurality of TRPs or when the counter DAI field and the like are shared between the plurality of TRPs.

<HARQ-ACK Codebook Generation (3)>

The UE generates the HARQ-ACK codebook by using at least one of the counter DAI value and the total DAI value.

HARQ-ACK codebook generation (1) can be suitably applied to a case in which the dynamic HARQ-ACK codebook is configured for the UE, and the counter DAI or the counter DAI and the total DAI are jointly counted between the plurality of TRPs. As a matter of course, this is not restrictive, and this may be applied to another case.

The UE determines the HARQ-ACK bit of each TRP for each counter DAI. In each TRP, the counter DAI may be counted in ascending order of the cell index. Based on at least one of the counter DAI (or, the counter DAI and the total DAI) and the TRP index, the UE combines the HARQ-ACKs to determine the HARQ-ACK codebook.

Regarding the HARQ-ACK bit having the same counter DAI, the UE may determine mapping order, based on the TRP index. For example, the HARQ-ACK having a small TRP index may be prioritized (mapping in ascending order of the index), or the HARQ-ACK having a large TRP index may be prioritized (mapping in descending order of the index).

The UE may control generation of the HARQ-ACK codebook by taking at least one of the number of codewords (CWs) configured for each TRP and whether or not spatial bundling between the plurality of TRPs is applied into consideration.

<<Single PDCCH Base>>

FIG. 16 shows an example of HARQ-ACK codebook generation of a case in which the DAI and the total DAI are separately counted between the TRPs when single PDCCH base, by which one PDCCH (or, DCI) is transmitted from the plurality of TRPs, is applied. Scheduling of the PDSCH, control of the counter DAI value and the total DAI value, and the like are similar to those of the contents described with reference to FIG. 7B in the above.

Here, a case in which the maximum number of CWs of each TRP is 1 without spatial bundling between the TRPs being configured (no application) is shown.

In this case, M HARQ-ACKs are generated for the counter DAI for which the same value is configured across the plurality of TRPs. M corresponds to the number of TRPs, and here, a case in which M=2 is shown. Two HARQ-ACKs corresponding to the counter DAIs for which the same value is configured respectively correspond to TRP #0 and TRP #1.

Regarding M HARQ-ACK bits having the same counter DAI value, the UE may determine mapping order, based on the TRP index. Here, a case in which the HARQ-ACK having a small TRP index is prioritized (mapping in ascending order of the index) is shown.

Figure 16A:
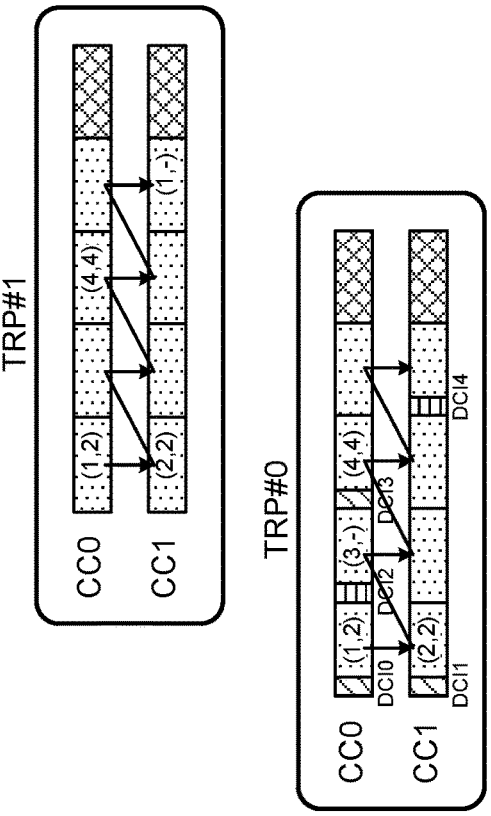
FIG. 16A and FIG. 16B are each a diagram to show another example of HARQ-ACK codebook generation according to the third aspect.
Figure 16B:
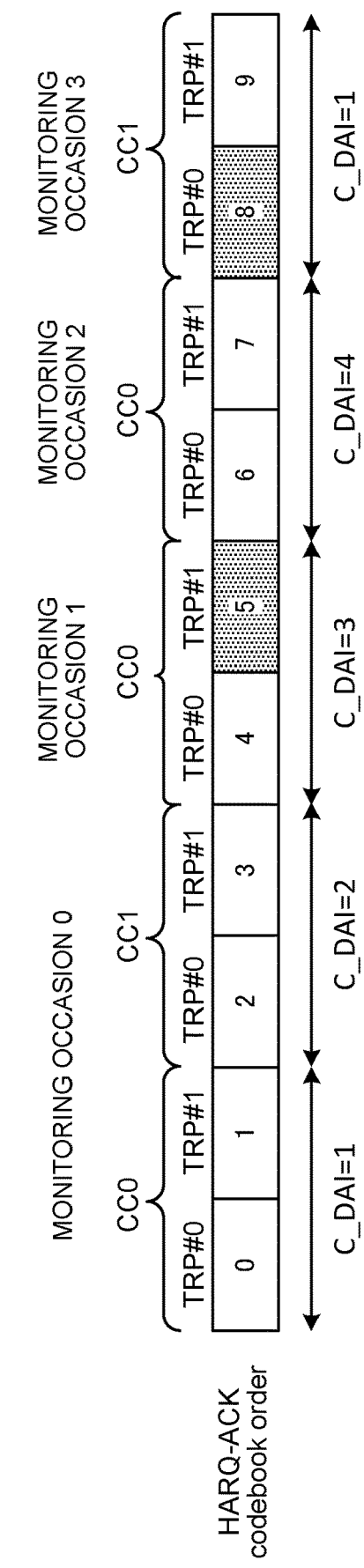

FIG. 16A shows a case in which the counter DAI field is configured for the plurality of TRPs in a shared manner (the count value corresponding to each TRP is reported by using one counter DAI field). Thus, even when the PDSCH is scheduled in TRP #0 and the PDSCH is not scheduled in TRP #1, the counter DAI value corresponding to TRP #1 is incremented.

For example, in FIG. 16A, the PDSCH corresponding to counter DAI value 3 corresponding to the PDSCH transmitted from TRP #0 in slot #n−3 of CC 0 is not present in TRP #1. The PDSCH corresponding to counter DAI value 1 corresponding to the PDSCH transmitted from TRP #1 in slot #n−1 of CC 1 is not present in TRP #0. In this case, the UE may determine the HARQ-ACK bits corresponding to the counter DAI values 3 and 1 as NACK (see FIG. 16B).

Figure 17A:
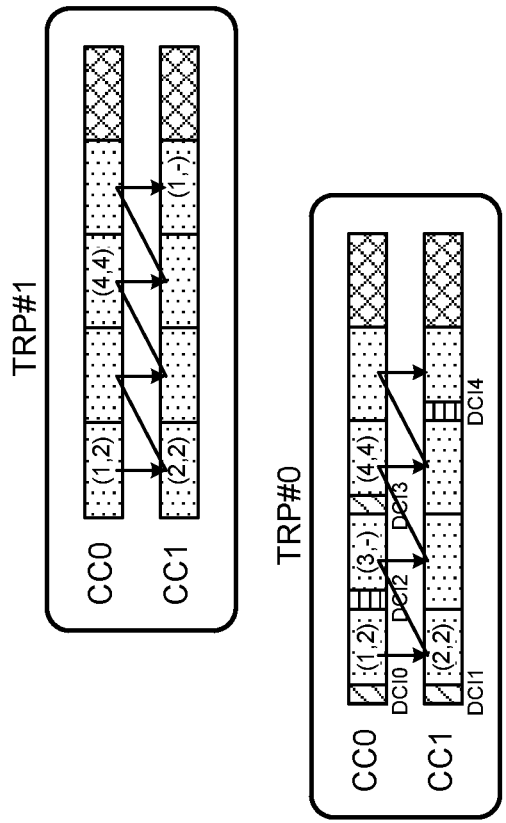
FIG. 17A and FIG. 17B are each a diagram to show another example of HARQ-ACK codebook generation according to the third aspect.
Figure 17B:
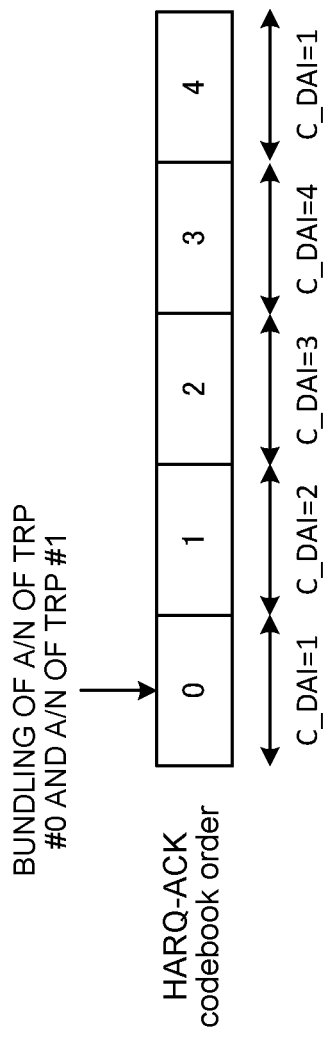

FIG. 17 shows a case in which spatial bundling is applied across the TRPs in FIG. 16. In this case, bundling (for example, binarization) is applied to the HARQ-ACK of TRP #0 and the HARQ-ACK of TRP #1 for which the same counter DAI is configured. For example, "ACK" may be generated when both of the HARQ-ACK corresponding to TRP #0 and the HARQ-ACK corresponding to TRP #1 are "ACK", or otherwise "NACK" may be generated.

In application of bundling, when the PDSCH is scheduled in only one of TRP #0 and TRP #1, the HARQ-ACK of the TRP in which the PDSCH is not scheduled may be determined as ACK. For example, in FIG. 17A, the PDSCH corresponding to counter DAI value 3 corresponding to the PDSCH transmitted from TRP #0 in slot #n−3 of CC 0 is not present in TRP #1. In this case, the HARQ-ACK corresponding to counter DAI value 3 may be determined by taking only the HARQ-ACK corresponding to TRP #0 into consideration (or, by assuming that the HARQ-ACK corresponding to TRP #1 is ACK) (see FIG. 17B).

By applying bundling to the HARQ-ACKs of the plurality of TRPs for which the same counter DAI is configured, the HARQ-ACK of 1 bit (in a case of CW=1 of each TRP) can be generated for each counter DAI.

<<Multi-PDCCH Base>>

Figure 18A:
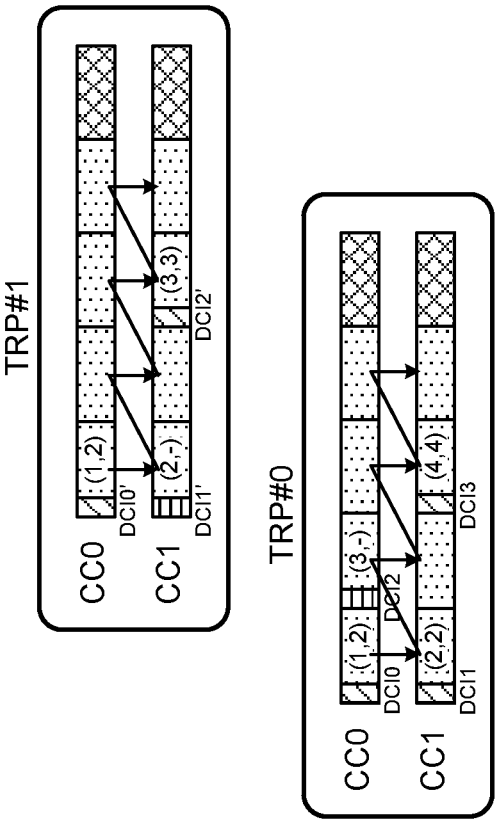
FIG. 18A and FIG. 18B are each a diagram to show another example of HARQ-ACK codebook generation according to the third aspect.

FIG. 18 shows an example of HARQ-ACK codebook generation of a case in which the DAI and the total DAI are separately counted between the TRPs when multi-PDCCH base, by which a plurality of PDCCHs (or, DCIs) are transmitted from the plurality of TRPs, is applied. Scheduling of the PDSCH, control of the counter DAI value and the total DAI value, and the like are generally similar to those of the contents described with reference to FIG. 8 in the above.

In FIG. 18, the counter DAI value and the total DAI value included in the DCI (or, the PDCCH) transmitted in each of the TRPs are specified. Count of the counter DAI value and the total DAI value is controlled for each of the TRPs.

In this case, M HARQ-ACKs are generated for the counter DAI for which the same value is configured across the plurality of TRPs. M corresponds to the number of TRPs, and here, a case in which M=2 is shown. Two HARQ-ACKs corresponding to the counter DAI for which the same value is configured respectively correspond to TRP #0 and TRP #1.

Regarding M HARQ-ACK bits having the same counter DAI value, the UE may determine mapping order, based on the TRP index. Here, a case in which the HARQ-ACK having a small TRP index is prioritized (mapping in ascending order of the index) is shown.

When the number of scheduled PDSCHs (or, PDCCHs for transmitting the DCI) is different in TRP #0 and TRP #1, the counter DAI value (or, the total DAI value) may be different. For example, in FIG. 18A, the number of scheduled PDSCHs is four (counter DAI values 1 to 4) in TRP #0, whereas the number of scheduled PDSCHs is three (counter DAI values 1 to 3) in TRP #1.

Figure 18B:
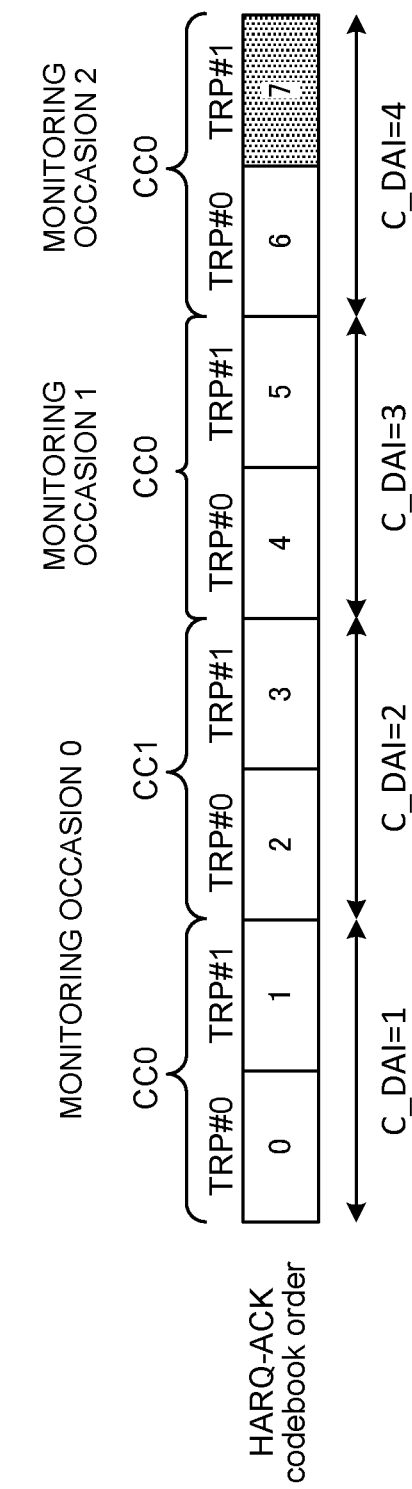

In this case, as shown in FIG. 18B, the UE may determine the HARQ-ACK bits corresponding to counter DAI value 4 in TRP #1 as NACK. Alternatively, the UE may generate the HARQ-ACK codebook by determining that there are no HARQ-ACK bits corresponding to counter DAI value 4 in TRP #1.

In this manner, by controlling the mapping order and ACK/NACK determination based on a certain condition regarding the HARQ-ACK bits corresponding to the same count DAI, the HARQ-ACK codebook can be appropriately generated even when the count of the DAI is separately controlled between the TRPs.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 19:
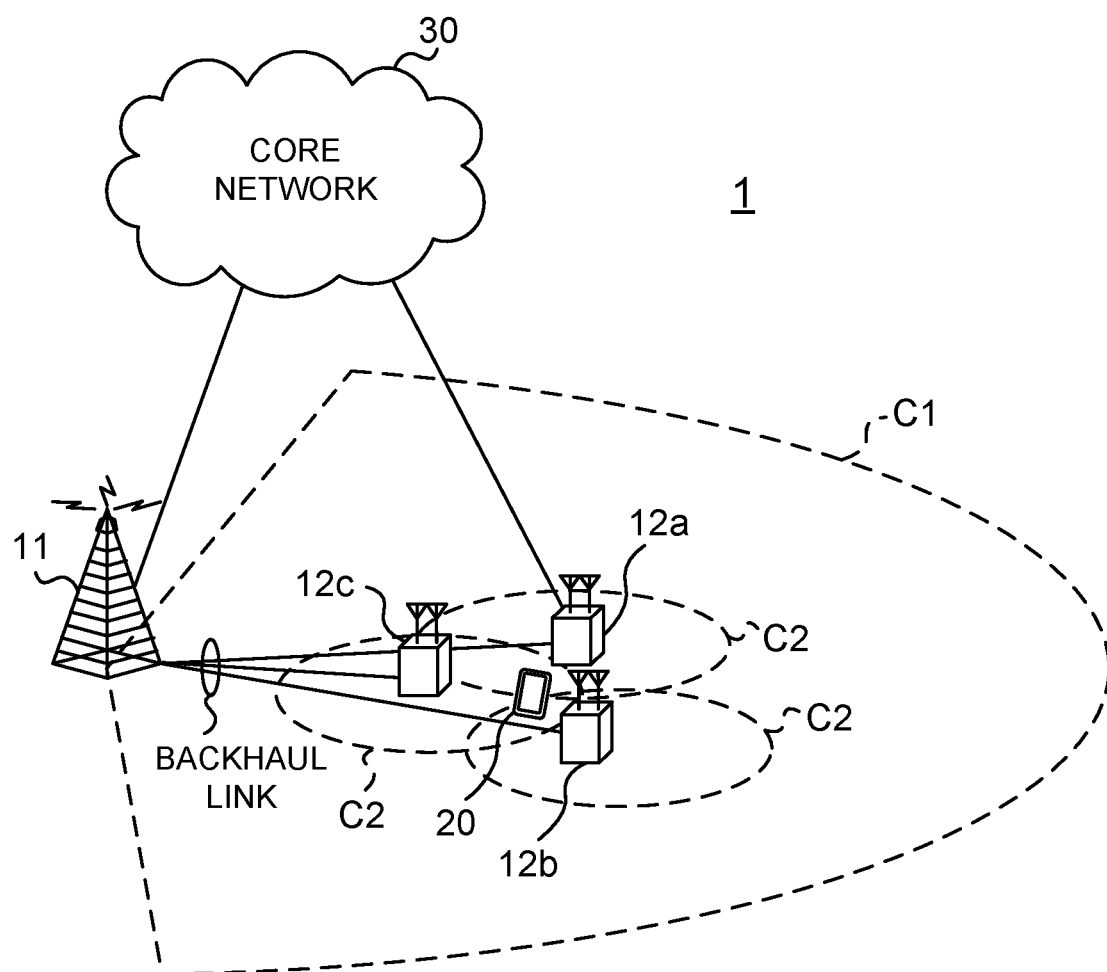
FIG. 19 is a diagram to show an example of a schematic structure of a radio communication system according to one embodiment.

FIG. 19 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (SGCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRPS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 20:
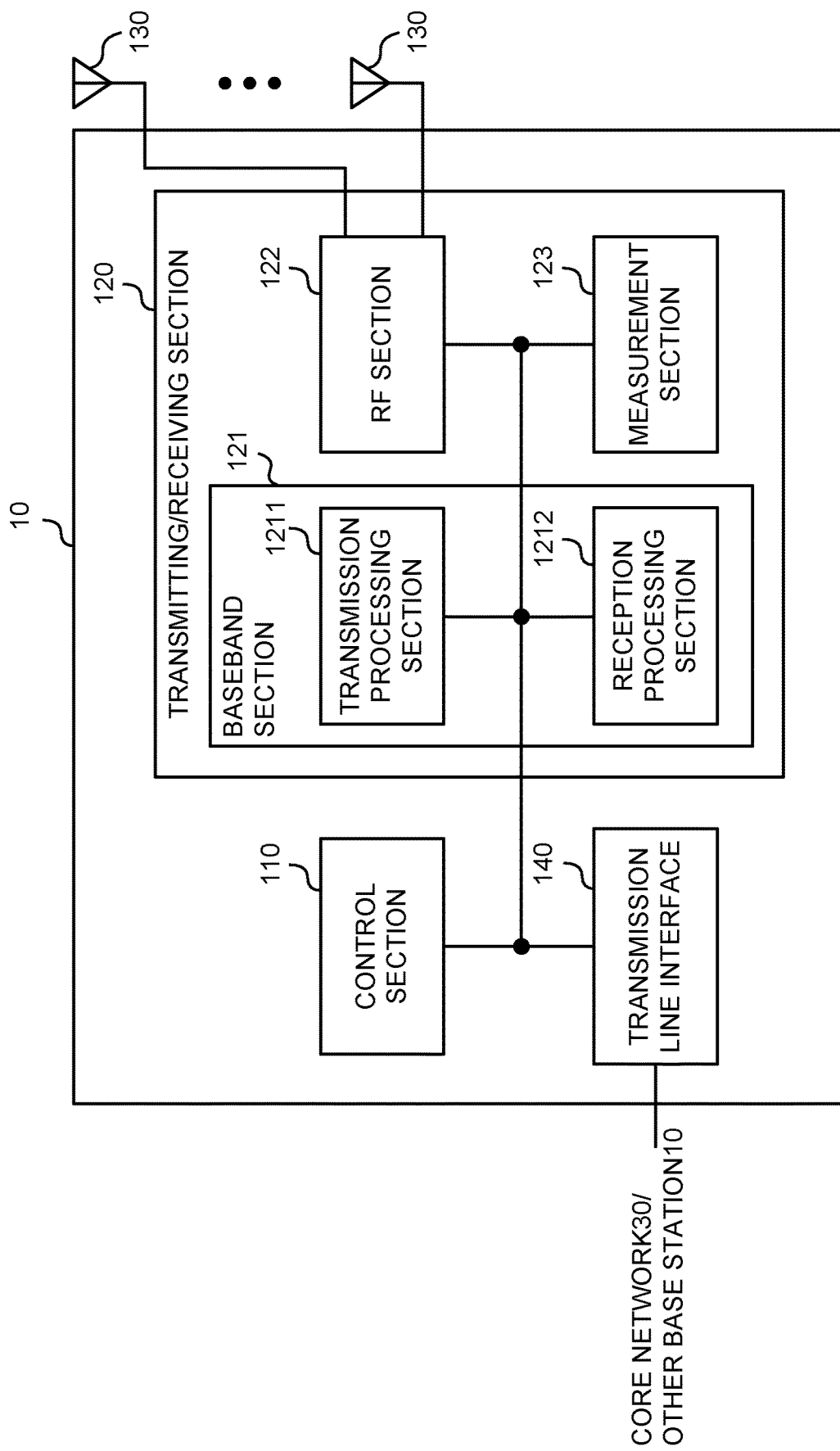
FIG. 20 is a diagram to show an example of a structure of a base station according to one embodiment.

FIG. 20 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 transmits a downlink shared channel transmitted from each of a plurality of transmission/reception points. The transmitting/receiving section 120 may receive a transmission confirmation signal corresponding to the downlink shared channel, based on downlink control information including at least one of a count value and a total value of DL assignment jointly controlled in the plurality of transmission/reception points.

Alternatively, the transmitting/receiving section 120 may receive a transmission confirmation signal corresponding to the downlink shared channel, based on downlink control information including at least one of a count value and a total value of DL assignment separately controlled in the plurality of transmission/reception points.

The transmitting/receiving section 120 may transmit the downlink control information in which at least one of a bit field corresponding to the count value and a bit field corresponding to the total value of the DL assignment is separately provided for each of the plurality of transmission/reception points.

The transmitting/receiving section 120 may transmit the downlink control information in which at least one of a bit field corresponding to the count value and a bit field corresponding to the total value of the DL assignment is provided for the plurality of transmission/reception points in a shared manner.

The transmitting/receiving section 120 may receive a transmission confirmation signal for the downlink shared channel, based on at least one of a count value of DL assignment jointly controlled between the plurality of transmission/reception points and a count value of DL assignment separately controlled between the plurality of transmission/reception points and an index of each of the plurality of transmission/reception points.

The control section 110 may control transmission of downlink control information including at least one of the count value and the total value of the DL assignment jointly controlled in the plurality of transmission/reception points. Alternatively, the control section 110 may control transmission of downlink control information including at least one of the count value and the total value of the DL assignment separately controlled in the plurality of transmission/reception points.

The control section 110 may jointly control the count value of the DL assignment between the plurality of transmission/reception points. The control section 110 may separately control the count value of the DL assignment and the index of each of the plurality of transmission/reception points between the plurality of transmission/reception points.

(User Terminal)

Figure 21:
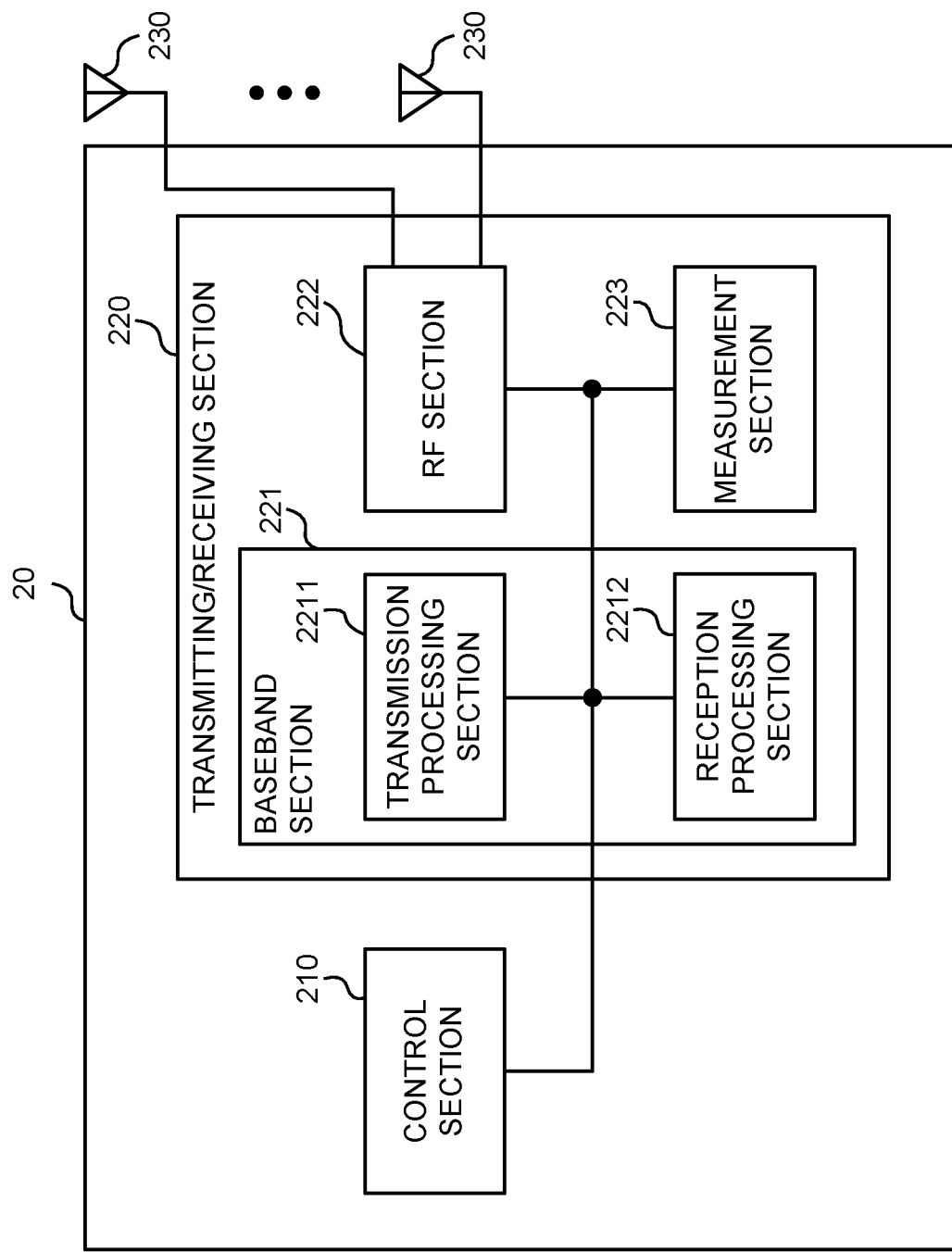
FIG. 21 is a diagram to show an example of a structure of a user terminal according to one embodiment.

FIG. 21 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 receives a downlink shared channel transmitted from each of a plurality of transmission/reception points. The transmitting/receiving section 220 may transmit a transmission confirmation signal corresponding to the downlink shared channel, based on downlink control information including at least one of a count value and a total value of DL assignment jointly controlled in the plurality of transmission/reception points. Alternatively, the transmitting/receiving section 220 may transmit a transmission confirmation signal corresponding to the downlink shared channel, based on downlink control information including at least one of a count value and a total value of DL assignment separately controlled in the plurality of transmission/reception points.

The transmitting/receiving section 220 may receive the downlink control information in which at least one of a bit field corresponding to the count value and a bit field corresponding to the total value of the DL assignment is separately provided for each of the plurality of transmission/reception points.

The transmitting/receiving section 220 may receive the downlink control information in which at least one of a bit field corresponding to the count value and a bit field corresponding to the total value of the DL assignment is provided for the plurality of transmission/reception points in a shared manner.

The transmitting/receiving section 220 may transmit a transmission confirmation signal for the downlink shared channel, based on at least one of a count value of DL assignment jointly controlled between the plurality of transmission/reception points and an index of each of the plurality of transmission/reception points and a count value of DL assignment separately controlled between the plurality of transmission/reception points.

The control section 210 may control transmission of the transmission confirmation signal corresponding to the downlink shared channel, based on downlink control information including at least one of the count value and the total value of the DL assignment jointly controlled in the plurality of transmission/reception points.

The control section 210 may control transmission of the transmission confirmation signal corresponding to the downlink shared channel, based on downlink control information including at least one of the count value and the total value of the DL assignment separately controlled in the plurality of transmission/reception points.

The control section 210 may control reception of the downlink control information in which at least one of a bit field corresponding to the count value and a bit field corresponding to the total value of the DL assignment is separately provided for each of the plurality of transmission/reception points. The control section 210 may control reception of the downlink control information in which at least one of a bit field corresponding to the count value and a bit field corresponding to the total value of the DL assignment is provided for each of the plurality of transmission/reception points in a shared manner.

The control section 210 may control transmission of a transmission confirmation signal for the downlink shared channel, based on at least one of a count value of DL assignment jointly controlled between the plurality of transmission/reception points and a count value of DL assignment separately controlled between the plurality of transmission/reception points and an index of each of the plurality of transmission/reception points.

The control section 210 may determine order of the retransmission control information, based on the count value of the DL assignment jointly controlled between the plurality of transmission/reception points. The control section 210 may determine the count value of the DL assignment jointly controlled between the plurality of transmission/reception points, based on the index of each of the plurality of transmission/reception points and a cell index.

When count of the DL assignment is separately controlled between the plurality of transmission/reception points, the control section 210 may determine a sub-codebook for each of the plurality of transmission/reception points and then determine a codebook for the transmission confirmation signal.

For the transmission confirmation signal in which the count value of the DL assignment is identical between the plurality of transmission/reception points, the control section 210 may determine order of the transmission confirmation signal, based on the index of each of the plurality of transmission/reception points.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 22:
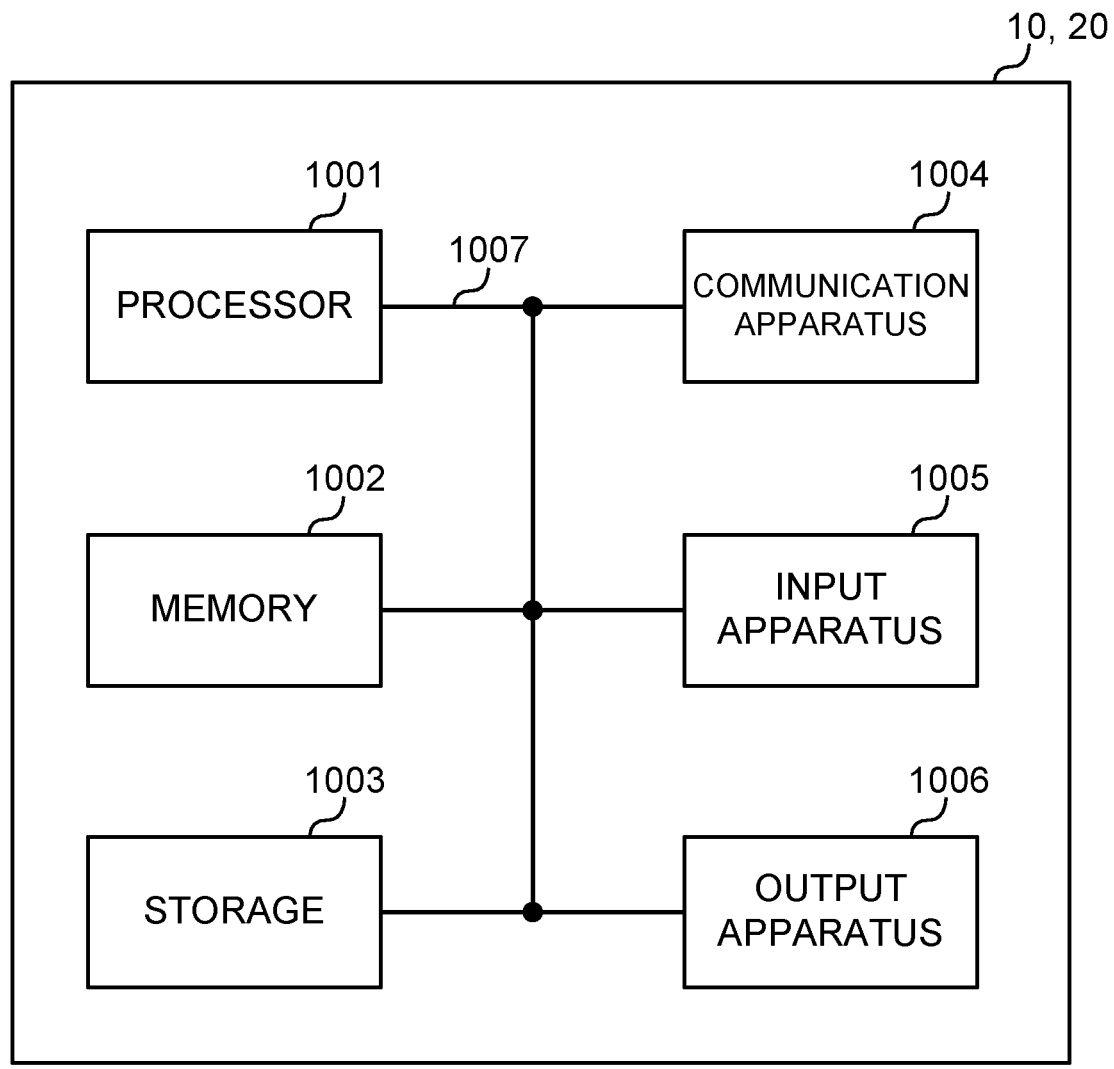
FIG. 22 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 22 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a transmitter that transmits capability information indicating whether the terminal supports a physical downlink shared channel (PDSCH) using downlink control information (DCI) transmitted from each of a plurality of transmit/receive points (TRPs);
    a receiver that receives the DCI transmitted from each of the plurality of TRPs in a same serving cell and receives the PDSCH scheduled by the DCI; and
    a processor that controls, based on a counter downlink assignment indicator (DAI) and a total DAI, the counter DAI and the total DAI being jointly counted between the plurality of TRPs and included in the DCI, generation of a hybrid automatic repeat request acknowledgement (HARQ-ACK) codebook corresponding to the PDSCH,
    wherein the counter DAI is counted first in an ascending order of an index indicating the plurality of TRPs, then in an ascending order of a serving cell index, and then in an ascending order of a physical downlink control channel (PDCCH) monitoring occasion index, and
    the total DAI is a total number of pairs of a TRP, a serving cell, and a PDCCH monitoring occasion.

2. A radio communication method for a terminal, comprising:
    transmitting capability information indicating whether the terminal supports a physical downlink shared channel (PDSCH) using downlink control information (DCI) transmitted from each of a plurality of transmit/receive points (TRPs);
    receiving the DCI transmitted from each of the plurality of TRPs in a same serving cell;
    receiving the PDSCH scheduled by the DCI; and
    controlling, based on a counter downlink assignment indicator (DAI) and a total DAI, the counter DAI and the total DAI being jointly counted between the plurality of TRPs and included in the DCI, generation of a hybrid automatic repeat request acknowledgement (HARQ-ACK) codebook corresponding to the PDSCH,
    wherein the counter DAI is counted first in an ascending order of an index indicating the plurality of TRPs, then in an ascending order of a serving cell index, and then in an ascending order of a physical downlink control channel (PDCCH) monitoring occasion index, and
    the total DAI is a total number of pairs of a TRP, a serving cell, and a PDCCH monitoring occasion.

3. A system comprising a terminal and a base station, wherein
    the terminal comprises:
        a transmitter that transmits capability information indicating whether the terminal supports a physical downlink shared channel (PDSCH) using downlink control information (DCI) transmitted from each of a plurality of transmit/receive points (TRPs);
        a receiver that receives the DCI transmitted from each of the plurality of TRPs in a same serving cell and receives the PDSCH scheduled by the DCI; and a processor of the terminal that controls, based on a counter downlink assignment indicator (DAI) and a total DAI, the counter DAI and the total DAI being jointly counted between the plurality of TRPs and included in the DCI, generation of a hybrid automatic repeat request acknowledgement (HARQ-ACK) codebook corresponding to the PDSCH, and the base station comprises:

a transmitter that transmits the DCI and the PDSCH from at least one of the plurality of TRPs in the same serving cell; and a processor of the base station that controls to jointly count the counter DAI and the total DAI, included in the DCI, between the plurality of TRPs, wherein the counter DAI is counted first in an ascending order of an index indicating the plurality of TRPs, then in an ascending order of a serving cell index, and then in an ascending order of a physical downlink control channel (PDCCH) monitoring occasion index, and the total DAI is a total number of pairs of a TRP, a serving cell, and a PDCCH monitoring occasion.

* * * * *